(12) United States Patent
Jain et al.

(10) Patent No.: US 8,974,763 B1
(45) Date of Patent: Mar. 10, 2015

(54) SYSTEM AND METHOD FOR PRODUCTION OF GRANULAR AMMONIUM SULFATE

(71) Applicant: Rentech, Inc., Los Angeles, CA (US)

(72) Inventors: Praveen Jain, Missouri City, TX (US); Santiago Gomez, Fulshear, TX (US); Mark D. Ibsen, Highlands Ranch, CO (US)

(73) Assignee: Rentech, Inc., Los Angeles, CA (US)

( * ) Notice: Subject to any disclaimer, the term of this patent is extended or adjusted under 35 U.S.C. 154(b) by 0 days.

(21) Appl. No.: 14/133,126

(22) Filed: Dec. 18, 2013

(51) Int. Cl.
*B01J 19/00* (2006.01)
*C01C 1/242* (2006.01)
*C05C 3/00* (2006.01)

(52) U.S. Cl.
CPC .................. *C05C 3/005* (2013.01); *C01C 1/242* (2013.01)
USPC ........... 423/545; 423/549; 423/550; 422/129; 422/187; 422/600; 422/232; 422/233; 71/61

(58) Field of Classification Search
USPC .......... 423/545, 549, 550; 422/129, 187, 600, 422/232, 233; 71/61
See application file for complete search history.

(56) References Cited

U.S. PATENT DOCUMENTS

| 2,729,554 A | | 1/1956 | Nielsson | |
|---|---|---|---|---|
| 2,741,545 A | | 4/1956 | Nielsson | |
| 3,464,809 A | * | 9/1969 | Hicks | 71/61 |
| 4,589,904 A | | 5/1986 | Harrison et al. | |
| 4,724,132 A | * | 2/1988 | Fabry | 423/395 |
| 4,762,546 A | * | 8/1988 | Boles | 71/30 |
| 6,117,406 A | * | 9/2000 | Vogel et al. | 423/310 |

FOREIGN PATENT DOCUMENTS

EP 475131 A1 * 3/1992

* cited by examiner

*Primary Examiner* — Timothy Vanoy
(74) *Attorney, Agent, or Firm* — Timothy S. Westby; Porter Hedges LLP

(57) ABSTRACT

A system for the production of ammonium sulfate granules including a pipe cross reactor (PCR) configured to contact concentrated sulfuric acid with anhydrous ammonia to produce a PCR product comprising ammonium sulfate; and a granulator fluidly connected to the PCR, whereby PCR product extracted from the PCR can be introduced into the granulator, an inlet for ammonium sulfate seed material, an ammonia sparger configured to spray liquid anhydrous ammonia directly onto a bed of ammonium sulfate granules within the granulator, a granulator vent configured for extraction of a vapor comprising unreacted ammonia from the granulator, and a granulator product outlet configured for extraction of granulator product comprising ammonium sulfate granules from the granulator. A method of producing ammonium sulfate granules is also provided.

47 Claims, 11 Drawing Sheets

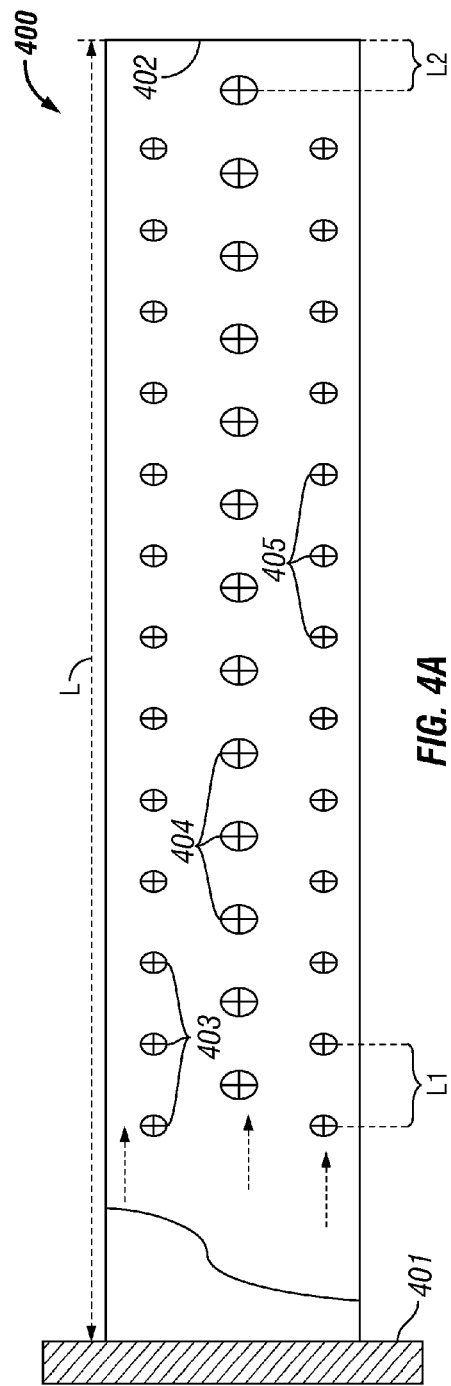
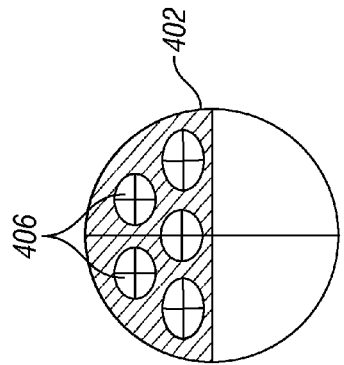
FIG. 4A
FIG. 4B
FIG. 4C

US 8,974,763 B1

SYSTEM AND METHOD FOR PRODUCTION OF GRANULAR AMMONIUM SULFATE

CROSS-REFERENCE TO RELATED APPLICATIONS

Not Applicable.

STATEMENT REGARDING FEDERALLY SPONSORED RESEARCH OR DEVELOPMENT

Not Applicable.

TECHNICAL FIELD

The present invention generally relates to the production of ammonium sulfate. More specifically, the present invention relates to the production of ammonium sulfate granules having a desired size. Still more specifically, the present invention relates to the production of ammonium sulfate granules via ammoniation of concentrated sulfuric acid with anhydrous ammonia in the presence of water in a pipe cross reactor (or 'PCR'), to produce a PCR product comprising ammonium sulfate, and subsequent granulation, via contact with liquid anhydrous ammonia, of seed material comprising ammonium sulfate and the PCR product.

BACKGROUND

Nitrogen and sulfur are essential to proper nutrition of living plants. These chemical elements are commonly classified by agronomists as primary and secondary nutrients, respectively. Both of these nutrients are required for most important farm crops.

Conventional ammonium sulfate production is predominantly from the scrubbing, for emissions control, of stacks containing $SO_2$. This material is then either concentrated for use as a solution fertilizer or granulated using evaporators and a granulator to solidify the concentrated slurry produced.

In 1983, the estimated annual production of by-product crystalline ammonium sulfate in the United States was about 2 million short tons. By-product ammonium sulfate is primarily produced from the production of caprolactam, from the production of methacrylates, and in the coking of coal. These by-products comprising ammonium sulfate are commonly recovered as relatively dilute solutions which must subsequently be concentrated, for example in a crystallizer, to cause precipitation of the ammonium sulfate. The resulting fine crystalline product is separated from the mother liquor, and utilized primarily in the fertilizer industry. The relatively few large ammonium sulfate crystals are separated from the plethora of small ammonium sulfate crystals, for example by screening, and may be suitable for use as direct application fertilizer or for blending with other fertilizer materials provided that there is homogeneity with respect to the particle sizes of the various materials making up the fertilizer.

The physical state of fine- or standard-size crystalline by-product ammonium sulfate is suitable for the manufacture of chemically granulated fertilizer, which is commonly referred to as 'compound,' 'complex,' or 'co-granulated' fertilizer. Generally, in the manufacture of such complex fertilizers, all ingredients are homogeneously combined prior to formation of particulate granules therefrom, such that each granule of the resultant fertilizer mixture contains all ingredients in a predetermined proportion, and in mechanically and/or chemically bonded units. In this manner, application of the fertilizer to the soil desirably results in substantially uniform application of the fertilizer ingredients.

Most of the crystalline by-product ammonium sulfate as recovered from such crystallization operations is not in a suitable physical state, particularly with respect to particle size, for use in 'bulk blends' or 'dry mixed' fertilizers. Fertilizers of this type consist of simple, dry, mechanical mixtures of discrete, nonbonded granules of two or more chemical compositions. The granules of different composition are blended in proportions calculated to yield a mixture of the desired overall fertilizer nutrient composition. This method of fertilizer preparation, being simple and adaptable to small production operations at or near the locations of fertilizer usage, remains popular in the United States. However, to ensure the homogeneity within a given small volume of such dry-blended fertilizers during mixing, handling, and field application, the various ingredients must have closely matched particle size distributions. Preparing blends from ingredients of unmatched particle size undesirably results in segregation of the various components during usage. Homogeneity is unlikely when segregation occurs, and undesirable agronomic effects are likely to result. In view of the need for the individual ingredients of bulk blends to be matched in particle size distribution, crystalline by-product ammonium sulfate, with its small particle size, cannot typically be incorporated properly therein.

Conventional application equipment for broadcast or row placement application of direct application solid fertilizer is designed for handling free-flowing granular type materials, such as granular or pelleted ammonium nitrate or urea. Such equipment will generally not properly handle such fine crystalline ammonium sulfate. When attempts are made to apply nongranular materials, such as crystalline by-product ammonium sulfate, with use of conventional application equipment, achieving uniform ground coverage is difficult due to the poor flow characteristics and bridging tendency of fine particles in the applicator.

Accordingly, there remains a need in the art for a system and method of producing ammonium sulfate granules having a desired average granule size, hardness, pill characteristics, and/or micronutrient composition.

SUMMARY

Herein disclosed is a system for the production of ammonium sulfate granules, the system comprising: a pipe cross reactor (PCR) configured to contact concentrated sulfuric acid with anhydrous ammonia to produce a PCR product comprising ammonium sulfate; and a granulator fluidly connected to the PCR, whereby PCR product extracted from the PCR can be introduced into the granulator, an inlet for ammonium sulfate seed material, an ammonia sparger configured to spray liquid anhydrous ammonia directly onto a bed of ammonium sulfate granules within the granulator, a granulator vent configured for extraction of a vapor comprising unreacted ammonia from the granulator, and a granulator product outlet configured for extraction of granulator product comprising ammonium sulfate granules from the granulator. In embodiments, the PCR is constructed to be resistant to the concentrated sulfuric acid introduced thereto. In embodiments, the PCR is constructed of acid resistant material. In embodiments, the PCR is fluidly connected to the granulator via a PCR product sparger configured to spray the PCR product into the granulator via a plurality of PCR product sparger nozzles. In embodiments, the ammonia sparger is located below the PCR product sparger.

In embodiments, the granulator is a rotary granulator. The system may comprise a dryer fluidly connected to the granulator, whereby granulator product can be introduced into the dryer. In embodiments, the dryer is a rotary dryer. In embodiments, the dryer is configured to provide a dried ammonium sulfate product comprising less than about 4, 3, 2, 1, or 0.5 weight percent moisture. In embodiments, the dryer operates with less than about 0.08 MMBTU of fuel gas per ton of granulator product introduced thereto. In embodiments, the dryer is a co-current flow dryer, wherein combustion air and fuel gas introduced thereto flow co-currently with the flow of granulator product therethrough.

In embodiments, the system comprises one or more sizing screens configured to separate on-size ammonium sulfate granules having a largest dimension within a desired range from undersized ammonium sulfate granules having a largest dimension below the desired range and oversized ammonium sulfate granules having a largest dimension above the desired range. The system may comprise one or more recycle lines configured to recycle at least a portion of the undersized ammonium sulfate granules, at least a portion of the oversized ammonium sulfate granules, a portion of the on-size ammonium sulfate granules, or a combination thereof, to the granulator as seed material. In embodiments, the on-size ammonium sulfate granules have a size guide number (SGN) in the range of from about 280 to about 350. In embodiments, the system comprises a product cooler/deduster fluidly connected to the one or more sizing screens, whereby at least a portion of the on-size ammonium sulfate granules can be introduced thereto, thus producing a dedusted ammonium sulfate product, and a product cooler offgas. In embodiments, the product cooler/deduster is configured to contact the on-size ammonium sulfate granules introduced thereto with a deduster. In embodiments, the deduster is non-aqueous.

In embodiments, the system comprises a dryer cyclone fluidly connected to the dryer whereby at least a portion of a dryer vent gas can be introduced thereto, and configured to separate solids therefrom, thus producing a dryer cyclone offgas and a dryer cyclone separated solids stream. A recycle line may be configured to introduce solids separated via the dryer cyclone into the granulator as at least a portion of the seed material. The system may comprise one or more elevators configured to transport ammonium sulfate granules throughout the system, and a dust cyclone configured to separate dust comprising ammonium sulfate from gas introduced thereto from the one or more elevators, from the one or more sizing screens, or from a combination thereof, thus producing a dust cyclone offgas, and a dust cyclone separated solids stream. The system may comprise a recycle line configured to introduce solids separated via the dust cyclone into the granulator as at least a portion of the seed material.

In embodiments, the system comprises at least one scrubber selected from the group consisting of: granulator scrubbers fluidly connected with the granulator, and configured to scrub unreacted ammonia from the vapor comprising unreacted ammonia extracted from the granulator, thus producing a granulator scrubber spent scrubber liquor comprising ammonia, and a granulator scrubber vent gas; dryer primary scrubbers configured to scrub one or more components from at least a portion of the dryer cyclone offgas, thus providing a dryer primary scrubber spent scrubber liquor, and a dryer primary scrubber tailgas; recycle cooler-granulator primary scrubbers configured to scrub one or more components from a gas comprising at least a portion of the granulator scrubber vent gas, at least a portion of the dust cyclone offgas, at least a portion of the product cooler offgas, or a combination thereof, thus providing a recycle cooler-granulator primary scrubber spent scrubber liquor, and a recycle cooler-granulator primary scrubber tailgas; dryer tailgas scrubbers configured to scrub one or more components from the dryer primary scrubber tailgas, thus providing a dryer tailgas scrubber spent scrubber liquor, and a dryer tailgas scrubber tailgas; and recycle cooler-granulator tailgas scrubbers configured to scrub one or more components from the recycle cooler-granulator primary scrubber tailgas, thus providing a recycle cooler-granulator tailgas scrubber spent scrubber liquor, and a recycle cooler-granulator tailgas scrubber tailgas. The system may comprise one or more recycle paths whereby all or portions of one or more spent scrubber liquor selected from the group consisting of granulator scrubber spent scrubber liquors, dryer primary scrubber spent scrubber liquors, recycle cooler-granulator primary scrubber spent scrubber liquors, dryer tailgas scrubber spent scrubber liquors, and recycle cooler-granulator tailgas scrubber spent scrubber liquors, may be introduced into the PCR.

In embodiments, the system comprises an additive sparger configured to spray an additive into the granulator. In embodiments, the additive sparger is positioned above the ammonia sparger, above the elevation of introduction of the PCR product into the granulator, or both. The additive may comprise aluminum sulfate.

Also disclosed herein is a method of producing ammonium sulfate granules, the method comprising: introducing a pipe cross reactor (PCR) feed comprising concentrated sulfuric acid and anhydrous ammonia into a PCR configured to produce ammonium sulfate via ammoniation of the sulfuric acid, thus producing a PCR product comprising ammonium sulfate; and separately introducing at least a portion of the PCR product, ammonium sulfate seed material, and liquid anhydrous ammonia into a granulator configured to produce a granulator product comprising ammonium sulfate granules having a size within a desired size range, wherein not less than about 10 weight percent and not more than about 40 weight percent of the stoichiometrically required amount of anhydrous ammonia is introduced directly into the granulator. The desired size range may comprise size guide numbers (SGNs) from about 280 to about 350. In embodiments, the concentrated sulfuric acid has a concentration in the range of from about 90 weight percent to about 99 weight percent. In embodiments, the liquid anhydrous ammonia is introduced into the granulator via an ammonia sparger configured to distribute liquid anhydrous ammonia substantially uniformly across the granulator. In embodiments, the at least a portion of the PCR product is introduced into the granulator at a level above the level at which the liquid anhydrous ammonia is introduced.

The method may comprise introducing an additive into the granulator. In embodiments, the additive is added via an additive sparger. In embodiments, the additive sparger distributes the additive substantially uniformly across the granulator, at a level above the level of introduction of the at least a portion of the PCR product, at a level above the level of introduction of the liquid, anhydrous ammonia, or both. The additive may be selected from the group consisting of alums. In embodiments, the additive comprises aluminum sulfate.

In embodiments, the ammonium sulfate seed material is introduced into the granulator at or near a top thereof. In embodiments, the method comprises drying the granulator product to produce a dried ammonium sulfate product having a moisture content of less than about 1 weight percent. In embodiments, the method comprises separating the dried ammonium sulfate product into an undersized ammonium sulfate product comprising ammonium sulfate granules having a largest dimension below the desired size range, an oversized ammonium sulfate product comprising ammonium sulfate granules having a largest dimension above the desired size range, and an on-size ammonium sulfate product comprising ammonium sulfate granules having a largest dimension within the desired size range. In embodiments, the method comprises recycling at least a portion of the undersized ammonium sulfate product, at least a portion of the oversized ammonium sulfate product, a portion of the on-size ammonium sulfate product, or a combination thereof to the granulator as at least a portion of the seed material.

In embodiments, the method comprises dedusting at least a portion of the on-size ammonium sulfate product, thus producing a dedusted ammonium sulfate product, and a deduster offgas. In embodiments, dedusting comprises contacting the at least a portion of the on-size ammonium sulfate product with a non-aqueous deduster. In embodiments, the method comprises separating ammonium sulfate-containing dust from a dryer offgas comprising same, thus producing a reduced-solids dryer offgas, and a separated ammonium sulfate-containing dust. In embodiments, the method comprises recycling at least a portion of the separated ammonium sulfate-containing dust to the granulator as seed material.

In embodiments, the method comprises separating ammonium sulfate-containing dust from: a gas comprising same extracted from one or more elevators configured to transport ammonium sulfate granules; from one or more sizing screens utilized to separate the dried ammonium sulfate product into oversized, undersized, and on-size ammonium sulfate granules; or from a combination thereof, thus producing a reduced-solids offgas, and a second separated ammonium sulfate-containing dust. In embodiments, the method comprises scrubbing unreacted ammonia from a granulator vent gas, thus producing a granulator scrubbing spent scrubber liquor comprising ammonia, and a granulator scrubbing vent gas; scrubbing one or more components from a gas comprising at least a portion of the reduced-solids dryer offgas, thus providing a dryer primary scrubbing spent scrubber liquor, and a dryer primary scrubbing tailgas; scrubbing one or more components from a gas comprising at least a portion of the granulator scrubbing vent gas, at least a portion of the reduced-solids offgas, at least a portion of the deduster offgas, or a combination thereof, thus providing a recycle cooler-granulator primary scrubbing spent scrubber liquor, and a recycle cooler-granulator primary scrubbing tailgas; scrubbing one or more components from the dryer primary scrubbing tailgas, thus providing a dryer tailgas scrubbing spent scrubber liquor, and a dryer tailgas scrubbing tailgas; scrubbing one or more components from the recycle cooler-granulator primary scrubbing tailgas, thus providing a recycle cooler-granulator tailgas scrubbing spent scrubber liquor, and a recycle cooler-granulator tailgas scrubbing tailgas; or a combination thereof. The method may comprise recycling all or portions of one or more spent scrubber liquor selected from the group consisting of granulator scrubbing spent scrubber liquors, dryer primary scrubbing spent scrubber liquors, recycle cooler-granulator primary scrubbing spent scrubber liquors, dryer tailgas scrubbing spent scrubber liquors, and recycle cooler-granulator tailgas scrubbing spent scrubber liquors to the PCR.

These and other embodiments and potential advantages will be apparent in the following detailed description and drawings.

BRIEF DESCRIPTION OF THE DRAWINGS

For a detailed description of the preferred embodiments of the invention, reference will now be made to the accompanying drawings in which:

FIG. 4A is a schematic of an ammonia injector, according to an embodiment of this disclosure;

FIG. 4B is a cross sectional view of an ammonia injector, according to an embodiment of this disclosure;

FIG. 4C is a cross sectional view of an injector end of an ammonia injector, according to an embodiment of this disclosure;

In the figures, like numbers are utilized, when possible, to refer to like components, as will be apparent upon reading the following description and claims.

NOTATION AND NOMENCLATURE

Figure 1:
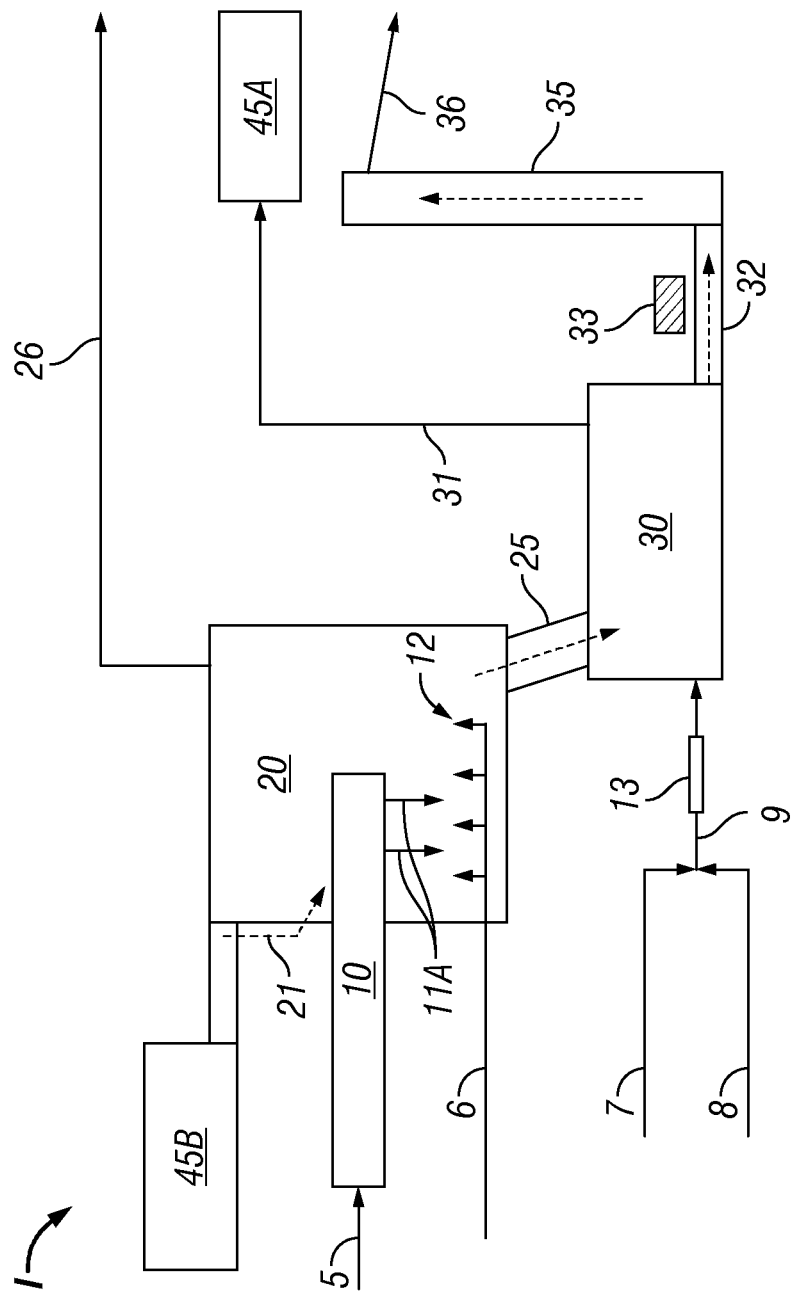
FIG. 1 is a schematic of an ammonium sulfate production system, according to an embodiment of this disclosure.

As used herein, the term 'dust' refers to solid particles, which particles may contain entrained ammonium sulfate, carried out of a piece of equipment with a gaseous and/or vapor stream.

The size guide number, or 'SGN', is a measurement used to assist in the selection of compatible materials for blending, by providing a common basis for size comparison and consistency. The SGN indicates the diameter of the median granule size, and is expressed in millimeters multiplied by 100. For example, an SGN of 235 indicates an average granule diameter of 2.35 mm, an SGN of 345 indicates an average granule diameter of 3.45 mm, etc. Similar size guide numbers are utilized for blending different fertilizer types, to facilitate homogeneous application thereof, helping to meet guaranteed nutrient analysis in fertilizer blends by reducing the amount of segregation and aiding in the ability to take a representative sample.

Unless otherwise stated, concentrations herein are expressed on a weight basis.

Use herein of the terms 'wet' and 'dry' when used in reference to ammonium sulfate streams is meant to refer to relative, rather than absolute, degrees of moisture.

DETAILED DESCRIPTION

Overview.

Herein disclosed are a system and method for the production of ammonium sulfate. The system and method incorporate the utilization of a pipe cross reactor to promote the reaction of anhydrous ammonia with concentrated sulfuric acid and water to produce ammonium sulfate, which is introduced into a granulator, along with recycled ammonium sulfate seed material, wherein a desired granulated ammonium sulfate product is produced. In embodiments, the system and method employ a pipe cross reactor having optimum metallurgy; multiple feed locations for ammonia (e.g., anhydrous ammonia) whereby enhanced product can be obtained; specific concentrations of concentrated sulfuric acid, whereby the cooling effect of water boil-off is optimally balanced with high acid input to the pipe cross reactor; specific additive(s) to improve one or more properties (e.g., hardness, size guide number, and/or pill characteristics, etc.) of the ammonium sulfate product; and/or appropriate grinding and/or recycle of ammonium sulfate as seed material to the granulator. The herein-disclosed system and method may be operable to provide from about 400 to 1700, 2000, 2200, or more short tons per day (STPD) of on-size ammonium sulfate granules.

System for Ammonium Sulfate Production.

Herein disclosed is a system for ammonium sulfate production. The ammonium sulfate system of this disclosure comprises a pipe cross reactor configured for the production of ammonium sulfate from sulfuric acid and anhydrous ammonia; a granulator configured for the production, from granulator feed material comprising ammonium sulfate produced in the pipe cross reactor and seed material comprising recycled ammonium sulfate, of a granulator product comprising ammonium sulfate granules; and processing equipment configured for separating product ammonium sulfate granules from the granulator product, for providing seed material for recycle to the granulator, and/or for providing ammonia and/or sulfuric acid for recycle to the pipe cross reactor, to the granulator, or both. Such processing equipment may comprise one or more apparatus selected from dryers, belts/conveyors, elevators, magnets, coolers, sizing screens, gas/solid separators (cyclones, baghouses, and/or etc.), scrubbers, tanks (e.g., sump tanks, feed storage tanks, water tanks, additive tanks, and/or etc.), mills, splitters/diverters, pumps, fans, and the like. Each of the components mentioned hereinabove will be described in more detail with reference to the figures hereinbelow.

An ammonium sulfate production system will now be described with reference to FIG. 1, which is a schematic of an ammonium sulfate production system I, according to an embodiment of this disclosure; and FIG. 2A, which is a schematic of an ammonium sulfate production system IIA, according to another embodiment of this disclosure. Ammonium sulfate production system I comprises pipe cross reactor 10, and granulator 20, along with processing equipment comprising dryer 30, magnet 33, dryer discharge elevator 35, dryer cyclone(s) 45A, dust and recycle cyclone(s) 45B (also referred to herein as 'equipment dust cyclone(s)' 45B). Ammonium sulfate production system IIA comprises pipe cross reactor 110, and granulator 120, along with processing equipment comprising granulator scrubber 164, dryer 130, dryer discharge conveyor 134, dryer discharge elevator 135, screen elevator conveyor 137, screen elevator 140, screw 143, sizing screens 144, mill(s) 150, recycle elevator 152, product cooler 149, belt scale 188, product elevator 190, product conveyor 192, dryer cyclone(s) 145A, equipment dust cyclone(s) 145B, dryer primary scrubber 169A, recycle cooler and granulator primary scrubber 169B, dryer tailgas scrubber 176A, recycle cooler and granulator tail gas scrubber 176B, primary scrubbers dust sump tank (or simply 'dust sump tank') 175A, dryer/recycle tailgas scrubber sump tank 175B, ammonia scrubber (or 'granulator scrubber') sump tank 175C, and PCR feed tank 186. A system of this disclosure may comprise a combination of some or all of the aforementioned processing equipment. FIGS. 2B and 2C are schematics of ammonium sulfate production systems IIB and IIC, respectively, which contain alterations of ammonium sulfate production system IIA of FIG. 2A. Specifically, further included in ammonium sulfate production system IIB of FIG. 2B are a water tank 101B and an additive storage tank 115A. Ammonium sulfate production system IIC of FIG. 2C comprises a modified dryer discharge elevator 135A, rather than screen elevator 135, screen elevator conveyor 137, and screen elevator 140; a screen feed conveyor 143A, rather than screen feed screw(s) 143; and a baghouse 199.

Pipe Cross Reactor 10/110.

Pipe cross reactor, or 'PCR', 10/110 is configured for the production of ammonium sulfate via reaction, in the presence of water, of sulfuric acid and anhydrous ammonia. The pipe cross reactor comprises one or more inlets for reactants, including anhydrous ammonia and concentrated sulfuric acid in aqueous solution. The aqueous solution may be provided by fresh water and/or recycled scrubber liquor, which will be described in more detail hereinbelow. The pipe cross reactor comprises one or more outlets for PCR product comprising ammonium sulfate. The pipe cross reactor may be positioned at least partially within the granulator, as indicated in the embodiment of FIGS. 1 and 2B-2C, and described in more detail hereinbelow. The pipe cross reactor may be horizontally-oriented, as indicated in the embodiments of FIGS. 1 and 2A-2C. The ammoniation/neutralization reaction liberates significant quantities of heat, raising the temperature within the pipe cross reactor, such that introduction/spraying of the PCR product into/onto the bed of ammonium sulfate granules within the granulator effects rapid evaporation of excess water.

Within the pipe cross reactor, concentrated sulfuric acid (e.g., 92 to 98 weight percent, as discussed further hereinbelow) is combined with a majority (e.g., about 80 weight percent, as discussed further hereinbelow) of the total stoichiometric amount of anhydrous ammonia required for the amount of sulfuric acid being ammoniated, along with ammonium sulfate seed material (i.e., recycled ammonium sulfate, as discussed further hereinbelow).

In the embodiment of FIG. 1, pipe cross reactor 10 is fluidly connected with a PCR feed inlet line 5, and is positioned partially within granulator 20, such that PCR product comprising ammonium sulfate can be introduced into granulator 20 via one or more pipe cross reactor outlets 11A. PCR feed inlet line 5 may be configured to introduce a feed comprising anhydrous ammonia (gas and/or liquid), concentrated sulfuric acid, and scrubber liquor recycled from one or more downstream scrubber(s) of the processing equipment.

Figures 1, 2A:
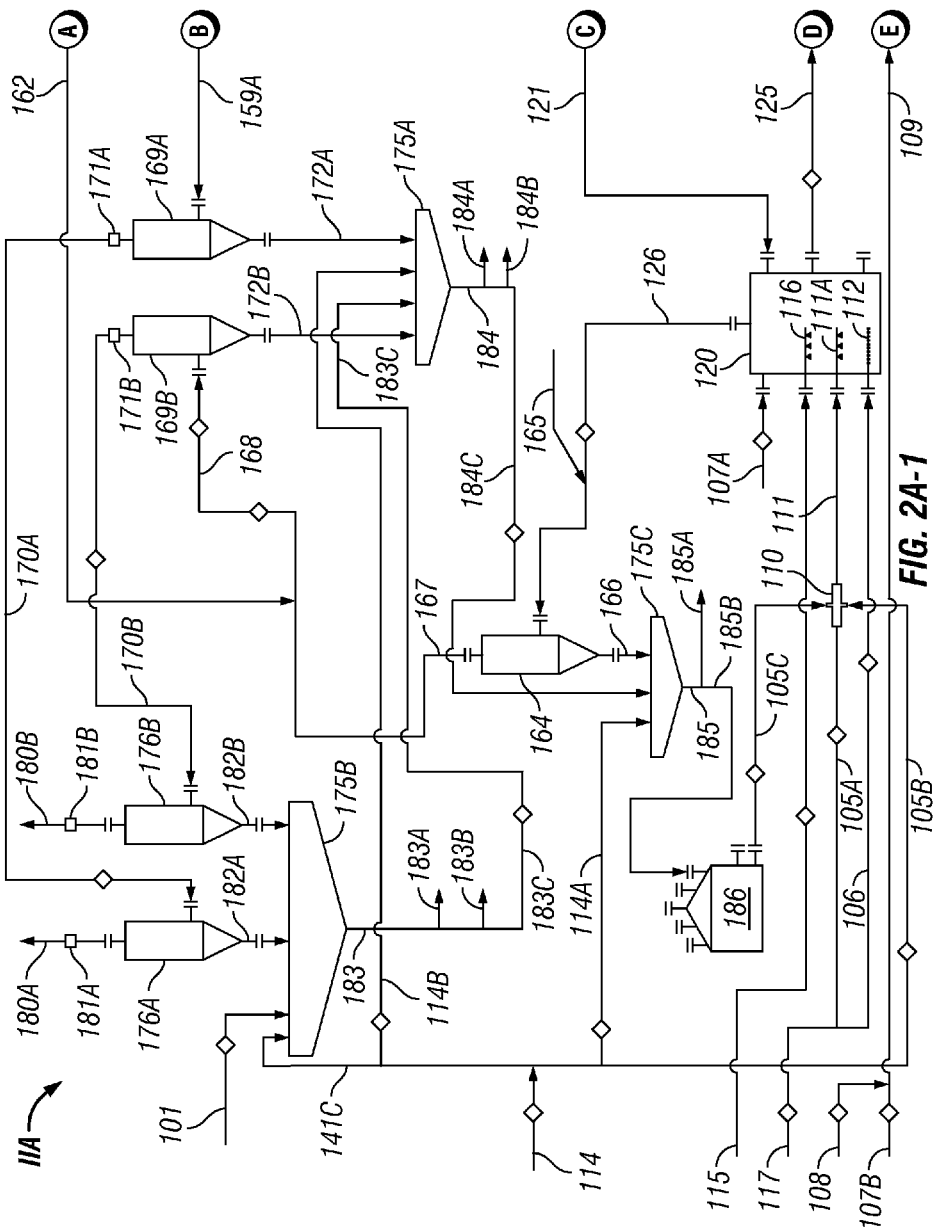
FIG. 2A (divided into FIG. 2A-1 and FIG. 2A-2) is a schematic of an ammonium sulfate production system, according to an embodiment of this disclosure.
Figures 2, 2A:
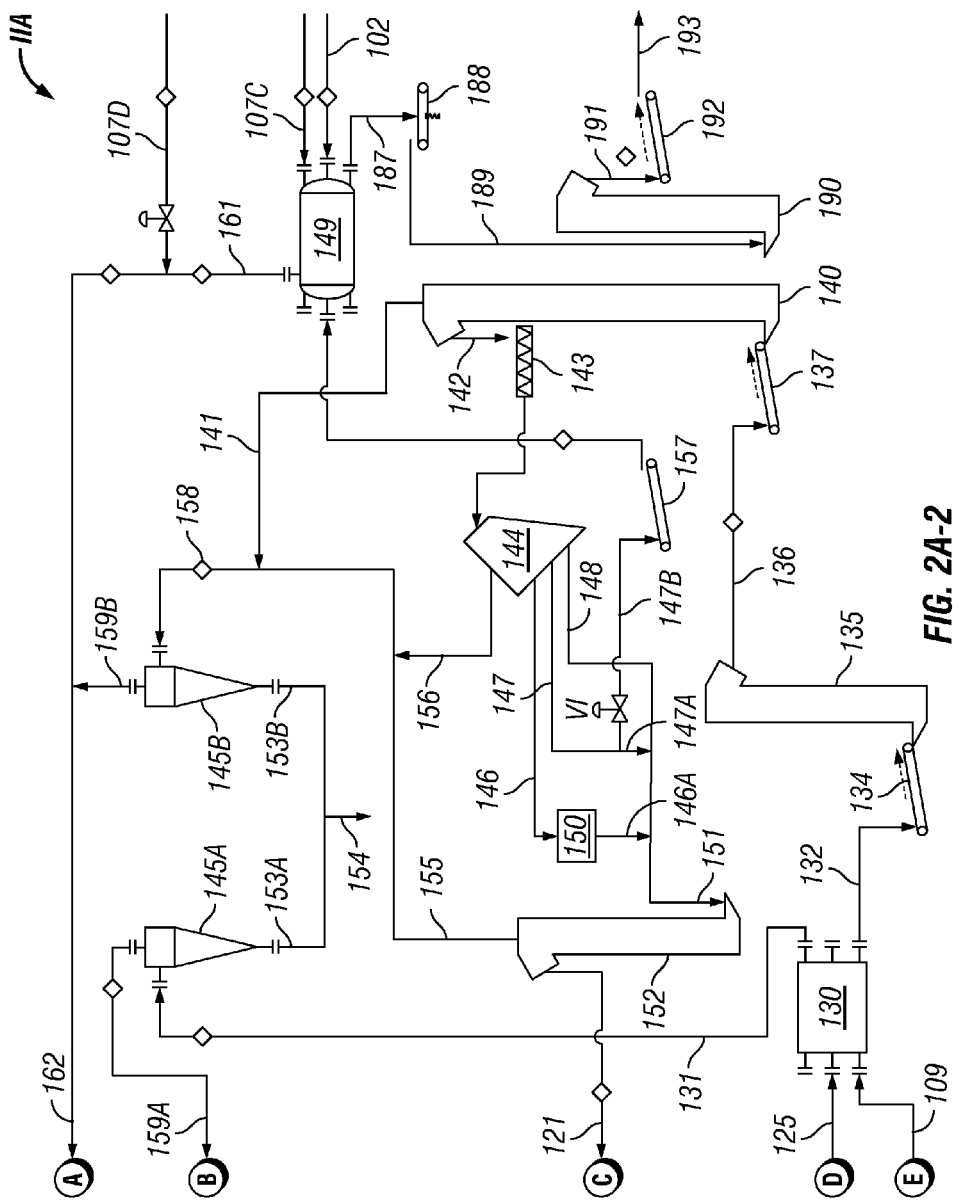
Figures 1, 2B:
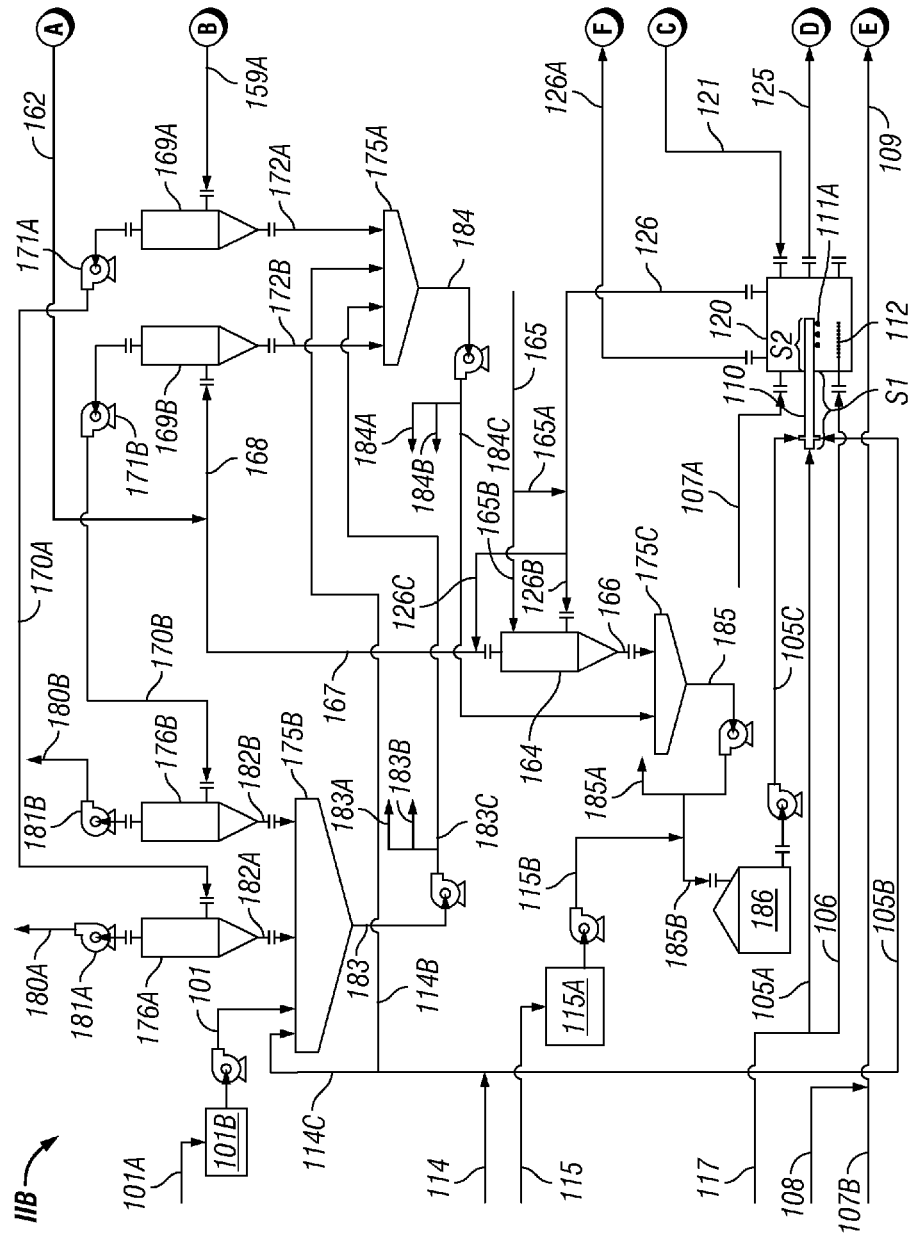
FIG. 2B (divided into FIG. 2B-1 and FIG. 2B-2) is a schematic of an ammonium sulfate production system, according to an embodiment of this disclosure.
Figures 2, 2B:
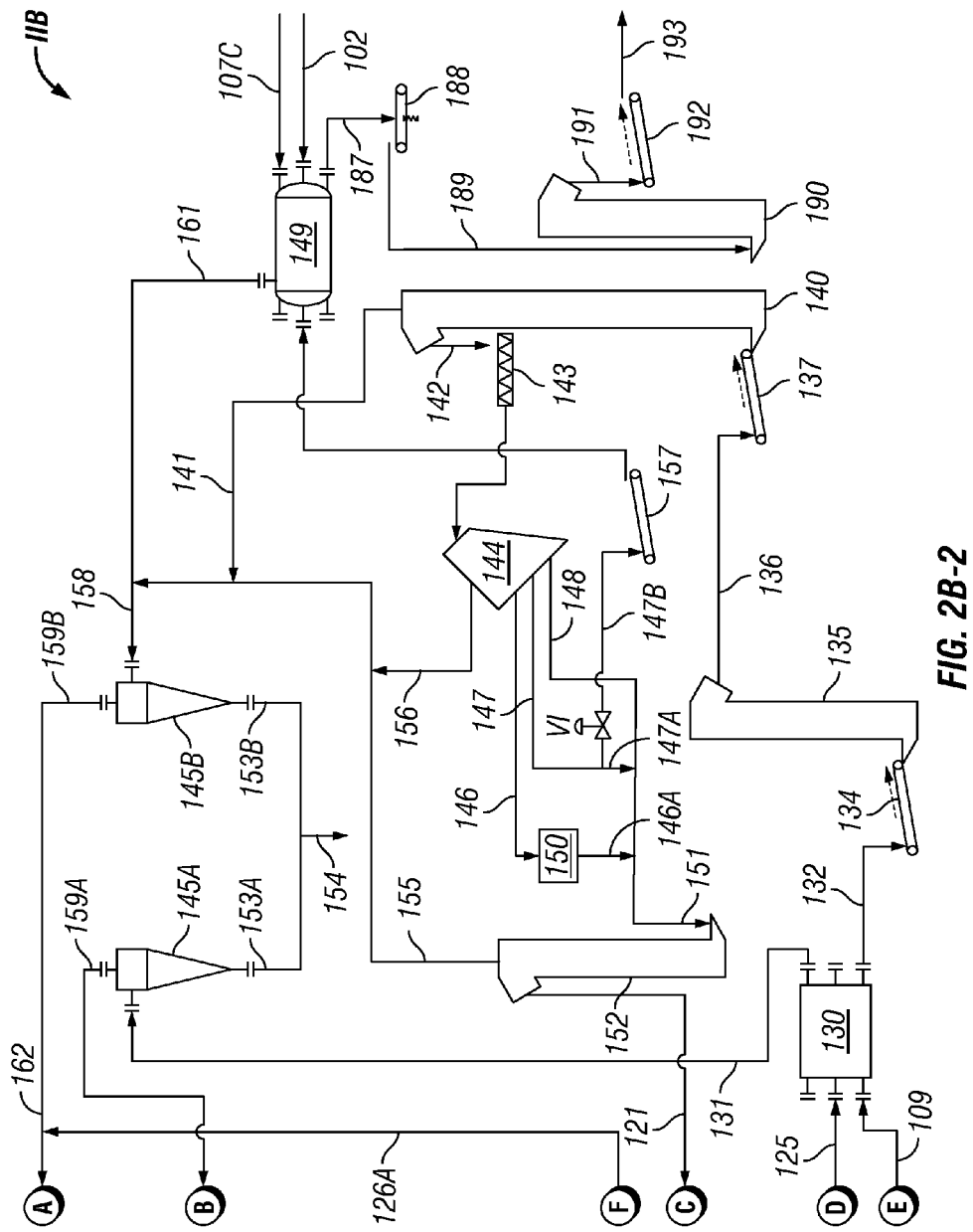
Figures 1, 2C:
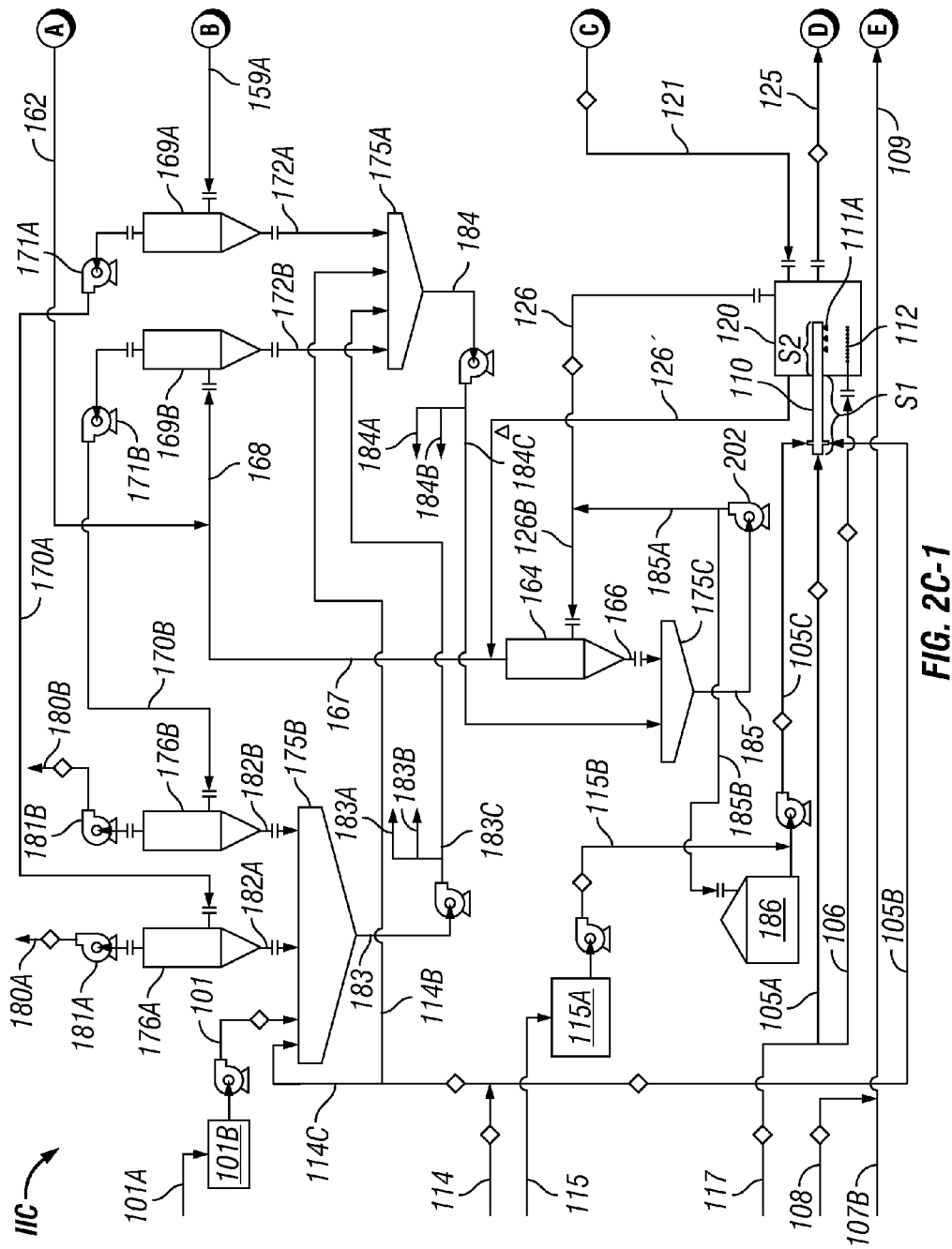
FIG. 2C (divided into FIG. 2C-1 and FIG. 2C-2) is a schematic of an ammonium sulfate production system, according to an embodiment of this disclosure.
Figures 2, 2C:
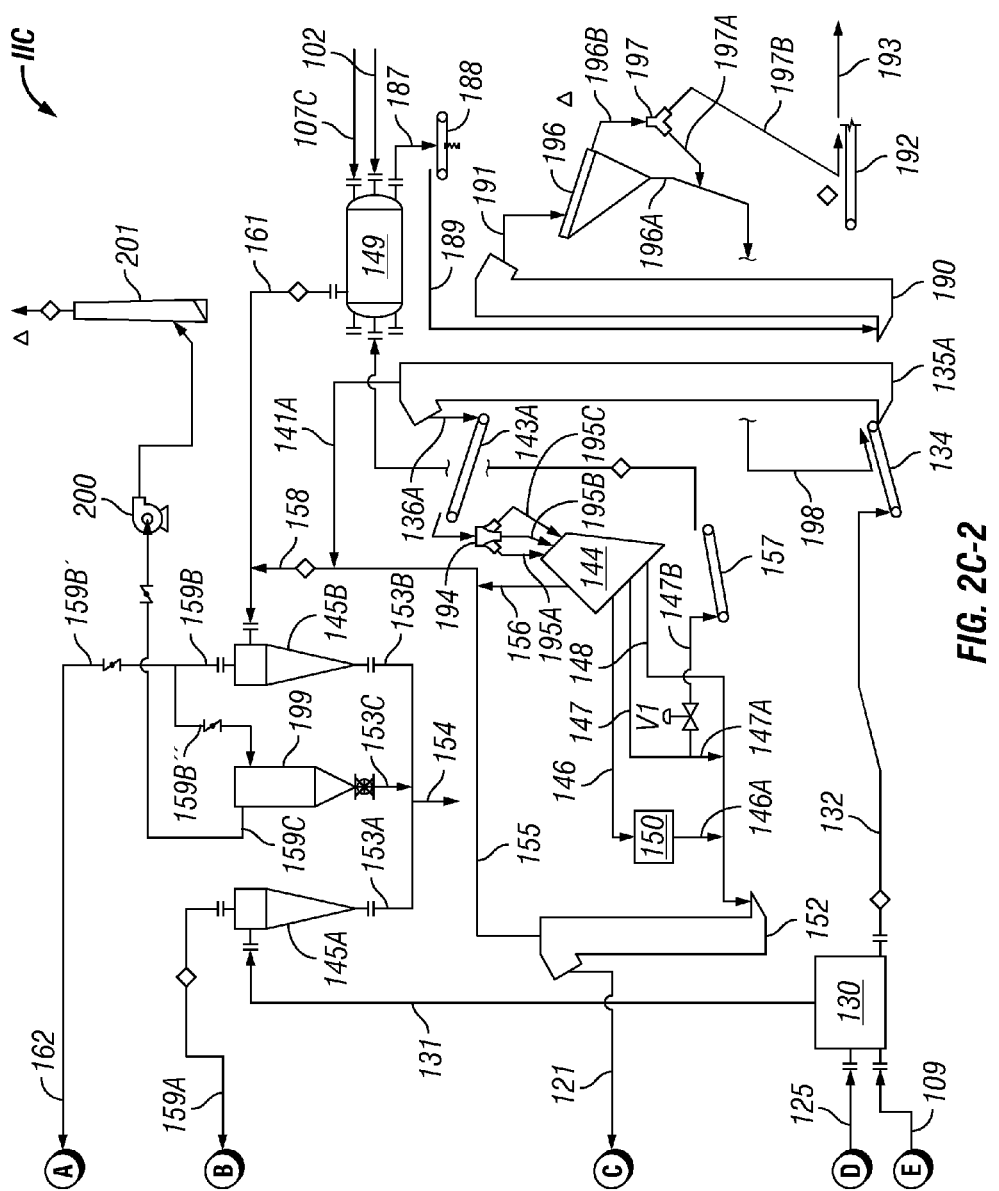

In the embodiment of FIGS. 2A-2C, pipe cross reactor 110 is fluidly connected with: a PCR ammonia feed inlet line 105A configured for the introduction of anhydrous ammonia thereto; a PCR sulfuric acid feed inlet line 105B configured for the introduction of concentrated sulfuric acid thereto; and with a PCR scrubber liquor feed inlet line 105C configured for the introduction of scrubber liquor thereto. In the embodiment of FIG. 2A, PCR 110 is positioned completely external to granulator 120, and is fluidly connected therewith via a PCR product outlet line 111. PCR product outlet line 111 is configured for introduction of PCR product, comprising ammonium sulfate, into granulator 120 via PCR product sparger (e.g., pipe sparger) 111A, which comprises one or a plurality of outlets whereby PCR product comprising ammonium sulfate is sprayed onto the bed of ammonium sulfate granules within granulator 120. In the embodiments of FIGS. 2B-2C, PCR 110 is positioned with a first section S1 located external to granulator 120, and a second section S2 located within granulator 120, whereby ammonium sulfate produced in PCR 110 is injected directly from PCR 110 via PCR product discharge outlets 111A.

Pipe cross reactor 10/110 may be any pipe cross reactor known to one of skill in the art to be suitable for producing ammonium sulfate via the ammoniation/neutralization of concentrated sulfuric acid. In embodiments, PCR 10/110 has a novel design as provided in more detail hereinbelow. In embodiments, PCR 10/110 is designed for operation with a sulfuric acid introduced thereto at a concentration in the range of from about 60 to about 99 weight percent, from about 60 to about 98 weight percent, from about 90 to about 99 weight percent, or from about 92 to about 98 weight percent sulfuric acid. Higher concentrations of sulfuric acid can be successfully converted to ammonium sulfate, but an aqueous mixture in the range of from about 90 to about 99 weight percent may provide an optimal balance between the cooling effect of the water boiling off and the ability to get a high acid feed to the pipe cross reactor.

As noted hereinabove, a majority of the total stoichiometric amount of anhydrous ammonia required for the amount of sulfuric acid being ammoniated is introduced via the PCR. The balance of the anhydrous ammonia needed is introduced, as discussed further hereinbelow, directly into the granulator. In embodiments, therefore, the feed to the PCR comprises from about 60 to about 90 weight percent, from about 70 to about 90 weight percent, or from about 75 to about 85 weight percent of the total anhydrous ammonia required for ammoniation of the sulfuric acid to be neutralized. In embodiments, the feed to the PCR comprises greater than or equal to 60, 70, 80, or 90 weight percent of the total anhydrous ammonia required for ammoniation of the sulfuric acid to be neutralized. In embodiments, more than or about 5, 10, 15, 20, 30, or 40 weight percent of the total anhydrous ammonia required for ammoniation of the sulfuric acid to be neutralized is added directly to the granulator, as discussed further hereinbelow.

The herein-disclosed system may be configured for operation of the PCR with feed comprising from about 40 to about 90 weight percent anhydrous ammonia, from about 50 to about 70 weight percent anhydrous ammonia, or from about 60 to about 65 weight percent anhydrous ammonia. The herein-disclosed system may be configured for operation of the PCR with feed comprising from about 25 to about 75 weight percent scrubber water/liquor, from about 40 to about 65 weight percent scrubber water/liquor, or from about 45 to about 55 weight percent scrubber water/liquor.

Thus, in the embodiment of FIG. 1, PCR feed inlet line 5 may be configured to provide a feed comprising from about 40 to about 90 weight percent anhydrous ammonia, from about 50 to about 70 weight percent anhydrous ammonia, or from about 60 to about 65 weight percent anhydrous ammonia, and/or from about 25 to about 75 weight percent scrubber water/liquor, from about 40 to about 65 weight percent scrubber water/liquor, or from about 45 to about 55 weight percent scrubber water/liquor, with the balance being sulfuric acid.

In the embodiment of FIGS. 2A-2C, PCR ammonia feed inlet line 105A, PCR sulfuric acid feed inlet line 105B, and PCR scrubber liquor feed inlet line 105C may be configured to provide a feed comprising: (via PCR ammonia feed inlet line 105A) from about 40 to about 90 weight percent anhydrous ammonia, from about 50 to about 70 weight percent anhydrous ammonia, or from about 60 to about 65 weight percent anhydrous ammonia; (via PCR scrubber water feed inlet line 105C) from about 25 to about 75 weight percent scrubber water/liquor, from about 40 to about 65 weight percent scrubber water/liquor, or from about 45 to about 55 weight percent scrubber water/liquor; with the balance being sulfuric acid (provided via PCR sulfuric acid feed inlet line 105B).

Description of a Novel PCR 10/110.

Figure 3:
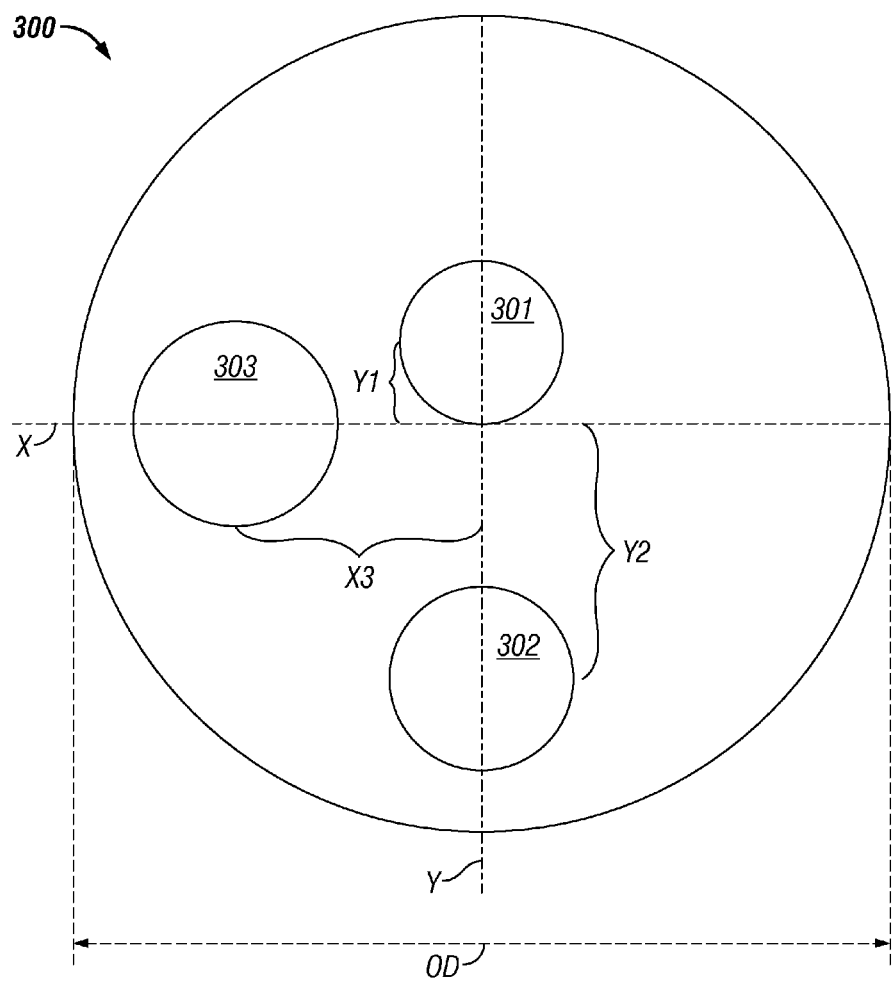
FIG. 3 is a cross sectional view of an inlet flange to a pipe cross reactor, according to an embodiment of this disclosure.

A description of a novel PCR suitable for use in the herein disclosed granular ammonium sulfate production system will now be described with reference to the figures. FIG. 3 is a cross sectional view of an inlet flange 300 to a pipe cross reactor 10/110, according to an embodiment of this disclosure, indicating the positioning of the inlet passages for ammonia/water injector 301, sulfuric acid nozzle 302, and water injector 303. In embodiments, the PCR has an outer diameter, OD, in the range of from about 10 to about 20 inches, from about 12 to about 16 inches, or from about 12 to about 14 inches. As noted above, PCR 10/110 may comprise an ammonia/water injector 301, a sulfuric acid nozzle 302, and a water injector 303.

Ammonia/water injector 301 may have any suitable cross-sectional shape. In embodiments, the cross section of ammonia/water injector 301 is substantially circular. In embodiments, the cross section of ammonia/water injector 301 is substantially elliptical. In embodiments, ammonia/water injector 301 has a diameter in the range of from about 1 to about 5, from about 2 to about 4, or from about 2.5 to about 3.5 inches. In embodiments, ammonia/water injector 301 has a diameter of about 1, 2, 3, 4, or 5 inches. Ammonia water injector 301 may be positioned with the center thereof a distance x1 from the centerline y, and a distance y1 from centerline x of the PCR flange. For example, in embodiments, x1 is in the range of from about 0 inch to about ±2 inches from the centerline y (i.e. in embodiments, ammonia/water injector 301 is positioned along axis y, as indicated in the embodiment of FIG. 3, or is positioned up to ±2 inches to the left or the right of center axis y). In embodiments, x1 is 0, as in the embodiment of FIG. 3. In embodiments, x1 is −1.75 inches. In embodiments, y1 is in the range of from about 0 inch to about ±2 inches above or below centerline x. In embodiments, y1 is +1.75 inches.

Sulfuric acid nozzle 302 may have any suitable cross-sectional shape. In embodiments, the cross section of sulfuric acid nozzle 302 is substantially circular. In embodiments, the cross section of sulfuric acid nozzle 302 is substantially elliptical. In embodiments, sulfuric acid nozzle 302 has a diameter in the range of from about 1 to about 6, from about 2 to about 6, or from about 3 to about 5 inches. In embodiments, sulfuric acid nozzle 302 has a diameter of about 1, 2, 3, 4, 5, or 6 inches. Sulfuric acid nozzle 302 may be positioned with the center thereof a distance x2 from centerline y, and a distance y2 from centerline x of the PCR outer tube. For example, in embodiments, x2 is in the range of from about 0 inch to about ±2 inches from the centerline y (i.e. in embodiments, sulfuric acid nozzle 302 is positioned along axis y, as indicated in the embodiment of FIG. 3, or is positioned up to ±2 inches to the left or the right of center axis y). In embodiments, x2 is 0, as in the embodiment of FIG. 3. In embodiments, y2 is in the range of from about ±3 to ±4 inches above or below centerline x. In embodiments, y2 is −3.75 inches. In embodiments, y2 is −4.25 inches.

Water injector 303 may have any suitable cross-sectional shape. In embodiments, the cross section of water injector 303 is substantially circular. In embodiments, the cross section of water injector 303 is substantially elliptical. In embodiments, water injector 303 has a diameter in the range of from about 1 to about 5, from about 2 to about 4, or from about 2.5 to about 3.5 inches. In embodiments, water injector 303 has a diameter of about 1, 2, 3, 4, or 5 inches. Water injector 303 may be positioned with the center thereof a distance x3 from the centerline y, and a distance y3 from centerline x of the PCR flange. For example, in embodiments, x3 is in the range of from about ±3 inch to about ±5 inches from the centerline y (i.e. in embodiments, water injector 303 is positioned from 3 to 5 inches to the left or right of axis y of inlet flange 300). In embodiments, x3 is +4 inches. In embodiments, x3 is +4.5 inches. In embodiments, y3 is in the range of from about 0 to ±2 inches above or below centerline x. In embodiments, y3 is 0 inches, as indicated in the embodiment of FIG. 3.

In embodiments, in inches, x1 is 0, y1 is +1.75, x2 is 0, y2 is −3.75, x3 is +4.5, and y3 is 0. In embodiments, in inches, x1 is −1.75, y1 is +1.75, x2 is 0, y2 is −4.25, x3 is +4, and y3 is 0.

FIG. 4A is a schematic of an ammonia injector 400 according to an embodiment of this disclosure. Ammonia injector 400 may be operable to evenly distribute ammonia/water mixture into the aqueous sulfuric acid mixture in reaction section of PCR 10/110. Ammonia/water injector 400 may extend a distance L into PCR 10/110, from an inlet end or flange 401 to an outlet end 402. L may be in the range of from about 1 to about 8 feet, from about 2 to about 6 feet, or from about 3 to about 4 feet. In embodiments, L is about 1, 1.5, 2, 2.5, 3, 3.5, or 4 feet. Ammonia injector 400 may comprise a pipe having an inner diameter in the range of from about 1 to about 5 inches, as noted hereinabove.

Ammonia injector 400 comprises a plurality of injector holes along at least a portion of the length L thereof. In embodiments, the perforated section of ammonia injector 400 comprises a length of more than or about 1.8, 2, 2.2, 2.3, 2.4, or 2.5 feet. In embodiments, the perforated section of ammonia injector 400 (i.e., the length comprising injector holes) comprises at least or equal to about 60, 70, 80, or 90% of the total injector length L.

Ammonia injector 400 may comprise 1, 2, 3, 4, or 5 rows of injector holes, with three indicated in the embodiment of FIG. 4. In embodiments, the injector holes of one row have a different diameter than the injector holes of at least one other row. For example, in the embodiment of FIG. 4A, row 1 comprises injector holes 403, row three comprises injector holes 405, and row 2 comprises injector holes 404, which have a greater diameter than injector holes 403 or 405 in rows one and three, respectively. In embodiments, the injector holes have diameters in the range of from about ¼" to about 1", or from about ⅜" to about ½". In embodiments, the injector holes in rows one and three (i.e. holes 403 and 405) have a diameter that is less than that of injector holes 404 in the second row. In embodiments, injector holes 403 and/or 405 have a diameter of about ¼", ⅜", or ½". In embodiments, injector holes 404 have a diameter of about ⅜", ½", or ¾".

In embodiments, each row comprises from about 8 to about 20 injector holes, from about 10 to about 15 holes, or from about 12 to about 15 holes. In embodiments, each row comprises the same number of injector holes. In embodiments, one row (e.g., the center row of an ammonia injector comprising three rows of injector holes) comprises a greater or fewer number of injector holes than at least one other row. In embodiments, each row comprises about 10, 11, 12, 13, 14, or 15 injector holes, with 13 indicated in the embodiment of FIG. 4B. In embodiments, the ammonia injector comprises a total number of injector holes in the range of from about 24 to about 60, from about 30 to about 50, or from about 35 to about 40. In embodiments, the ammonia injector comprises a total number of injector holes of about 25, 30, or 40, inclusive, with 39 indicated in the embodiment of FIG. 4A.

The injector holes may be a center-to-center distance L1 apart. L1 may be in the range of from about 1 to about 3 inches, from about 1.5 to about 2.5 inches, or from about 1.75 to about 2.25 inches. In embodiments, L1 is about 1, 1.5, 2, 2.5, or 3 inches. The injector holes in neighboring rows may be staggered relative to one another. For example, as indicated in the embodiment of FIG. 4A, injector holes 403 and 405 are aligned along length L (i.e., the centers thereof align vertically), while injector holes 404 are staggered therebetween (i.e., the centers thereof are located within L1, and do not align vertically with the centers of injector holes 403 and 405).

FIG. 4B is a cross sectional view of an ammonia injector 400, according to an embodiment of this disclosure. As noted in FIG. 4B, ammonia injector 400 may be situated such that the holes thereof are positioned downwardly. For example, ammonia injector 400 may be positioned such that a center row of holes faces straight downward, while additional rows of holes are positioned at angles α1 and α2 therefrom, whereby holes comprise a spread of α3 degrees around the circumference of ammonia injector 400. In embodiments, angles α1 and α2 are in the range of from about 10 to about 35 degrees, from about 15 to about 25 degrees, or from about 20 to about 25 degrees. In embodiments, angles α1 and/or α2 are about 10, 15, 20, 20.5, 21, 21.5, 22, 22.5, 23, 23.5, 24, 24.5 25, 26, 27, 28, 29, or 30 degrees. In embodiments, α3 is in the range of from 20 to about 60 degrees, from about 30 to about 50 degrees, or from about 35 to about 50 degrees. In embodiments, α3 is about 20, 25, 30, 35, 40, 45, 50, 55, or 60 degrees.

FIG. 4C is a cross sectional view of an injector end 402 of an ammonia injector, according to an embodiment of this disclosure. Injector end 402 may be located a length L2 from the center of the injector hole farthest from inlet flange 401. L2 may be about 0.5, 1, or 1.5 inches. The top half of injector end 402 may comprise a number of outlet holes 406. Injector end 402 may comprise from about 1 to about 10 outlet holes, from about 2 to about 7 outlet holes, or from about 3 to about 6 outlet holes. In embodiments, injector end 402 comprises at least or exactly 1, 2, 3, 4, 5, 6, 7, 8, 9, or 10 outlet holes, with five indicated in the embodiment of FIG. 4C. The top half of injector end 402 may comprise 1, 2, 3, or more rows of outlet holes, with two indicated in the embodiment of FIG. 4C. The outlet holes of neighboring rows may be staggered, as indicated in the embodiment of FIG. 4C, and described hereinabove with respect to the injector holes. The bottom half of injector end 402 may be open, as indicated in the embodiment of FIG. 4C. Outlet holes 406 may have a diameter in the range of from about ¼" to about ¾". In embodiments, outlet holes 406 have a diameter of about ⅜", ½", or ¾".

Figure 5:
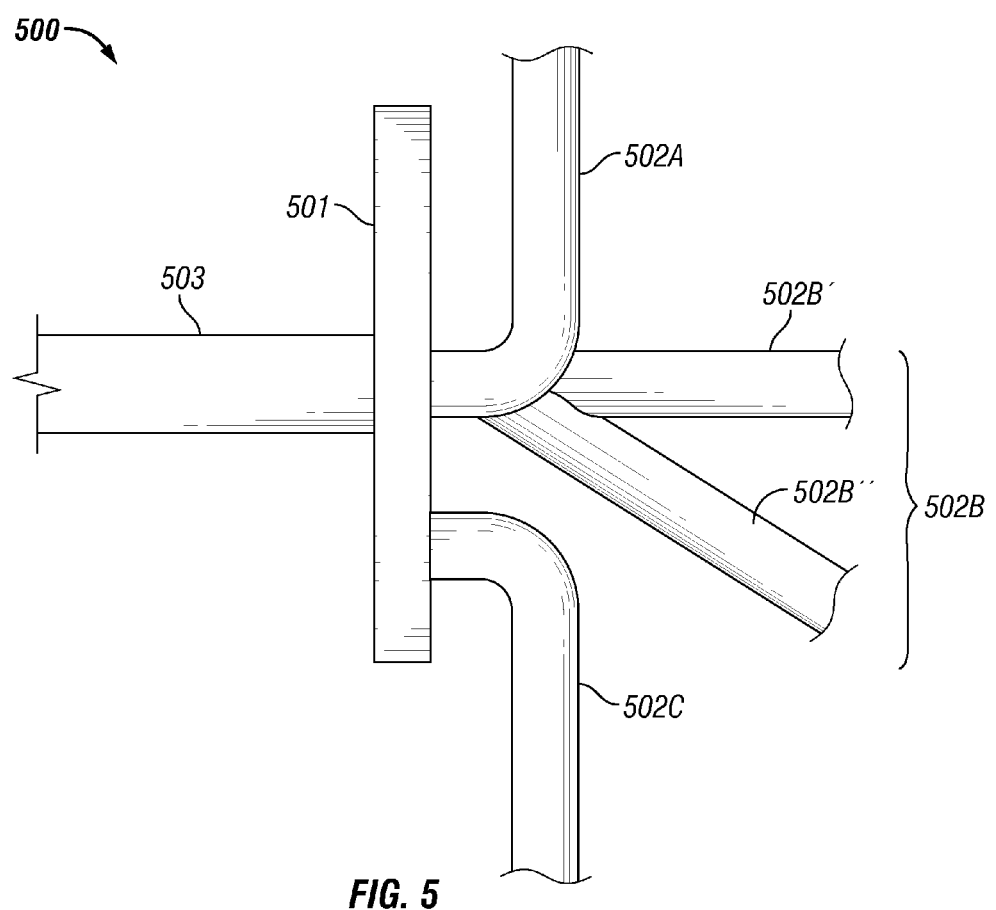
FIG. 5 is an isometric view of the feed nozzles of a pipe cross reactor, according to an embodiment of this disclosure.

FIG. 5 is an isometric view 500 showing the feed nozzles of a pipe cross reactor 10/110, according to an embodiment of this disclosure. Flange 501 orients sulfuric acid nozzle 502A, Y-nozzle 502B, and water nozzle 502C for introduction, respectively, of sulfuric acid, ammonia/water, and water/scrubber liquor into PCR 10/110. Sulfuric acid nozzle 502A, ending at flange 501, is configured for the introduction of concentrated sulfuric acid into PCR 10/110. Line 502W, configured for the introduction of ammonia, and line 502W‴, configured for the introduction of water, combine at the Y of Y-nozzle 502B, for introduction of ammonia/water into PCR 10/110 via ammonia injector 503, which is perforated, as discussed hereinabove with reference to FIGS. 4A-4C, for introduction of ammonia/water into the sulfuric acid within PCR 10/110. Water nozzle 502C is configured for the introduction of water (and recycled ammonium sulfate solution/scrubber liquor) into PCR 10/110. In embodiments, a cut of a certain angle (e.g., about 35, 40, 45, 50, or 55 degrees) on water nozzle 502C is utilized to direct water away from ammonia/water injector 503, possibly enabling an extended life thereof.

Figure 6:
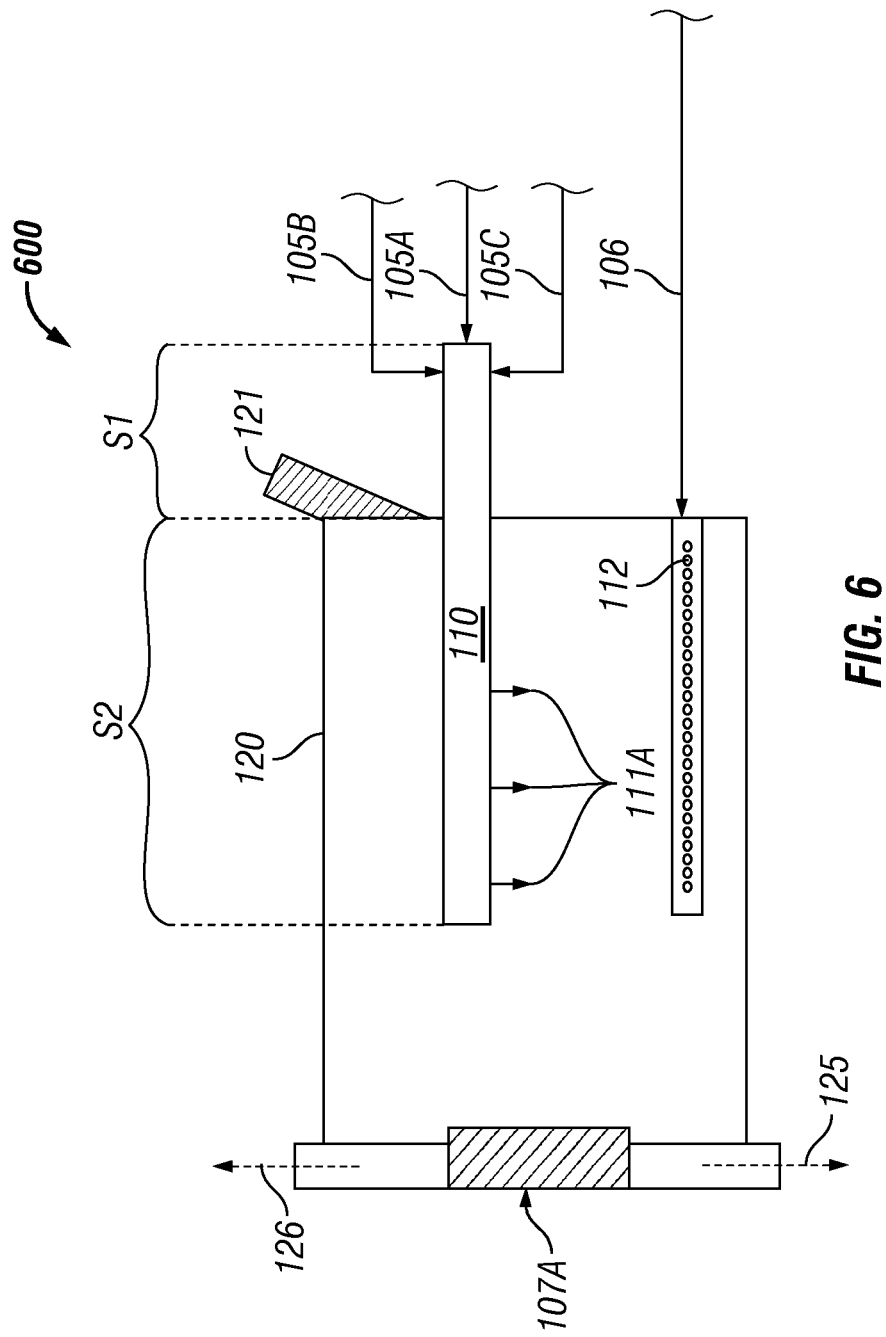
FIG. 6 is a schematic of a granulator and pipe cross reactor assembly, according to an embodiment of this disclosure.

FIG. 6 is a schematic of a granulator and pipe cross reactor assembly 600, according to an embodiment of this disclosure. As noted hereinabove, PCR 10/110 extends a distance into granulator 20/120. As indicated in the embodiment of FIG. 6, a reaction section S1 of PCR 110 may be positioned external to granulator 120, while a discharge section S2 is positioned internal to granulator 120. Reaction section S1 comprises the ammonia injector as described with reference to FIGS. 3, 4A-4C, and 5, configured for the production of ammonium sulfate via reaction of aqueous ammonia, injected into reaction section S1 of PCR 110 via Y-nozzle 502B and perforated ammonia injector 503, with sulfuric acid introduced via sulfuric acid nozzle 502A, in the presence of water/scrubber liquor introduced via water/scrubber liquor injector 502C. The ammonium sulfate produced in the reaction section S1 of PCR 110 passes into the discharge section S2 of PCR 110, which is configured to introduce the ammonium sulfate into the rotating ammonium sulfate bed in granulator 120 via PCR product sparger/holes 111A. Reaction section S1 may have a length in the range of from about 5 to about 40 feet, from about 10 to about 30 feet, or from about 15 to about 20 feet. Discharge section S2 may have a length in the range of from about 4 to about 16 feet, from about 6 to about 12 feet, or from about 8 to about 10 feet. Reaction section S1 may be angled relative to discharge section S2.

In embodiments, at least the reactant contact surfaces of PCR 10/110 and/or the sulfuric acid piping comprise TEFLON® or the like (e.g., polytetrafluoroethylene (PTFE), PFA, etc.), alloy 20, 316 SS, HASTELLOY C-276® (i.e., Alloy C-276), or a combination thereof. Such metallurgy may be optimal for the severe service (boiling acid) for which PCR 10/110 is configured. For example, the reaction section S1 may be TEFLON®-lined. For example, a TEFLON®-lined piping sleeve may be utilized within the reaction section of PCR 10/110. PCR 10/110 may be designed for operation at temperatures of up to about 450° F. (232.2° C.), pressures of up to about 150 psi, or both.

Granulator.

The ammonium sulfate production system of this disclosure comprises a granulator. Granulator 20/120 may be any suitable granulator known to one of ordinary skill in the art. For example, granulator 20/120 may be a rotary granulator, such as rotary-type ammoniator granulator drum, as described, for example, in U.S. Pat. Nos. 2,729,554; 2,741,545, and 4,589,904, which are hereby incorporated entirely herein for all purposes not contrary to this disclosure. Granulator 20/120 is configured to produce ammonium sulfate granules of a desired size (i.e., having a desired size guide number or SGN), and/or having a desired hardness, micronutrient content, and/or pill characteristics, via contact of the PCR product ammonium sulfate, with additional anhydrous ammonia, and with 'seed' recycled ammonium sulfate, which will be described further hereinbelow, and optionally with one or more additive. As discussed further hereinbelow, introduction of a portion of the anhydrous ammonia directly into the granulator (rather than introducing the entirety of the anhydrous ammonia via the pipe cross reactor), enhances solidification of the ammonium sulfate granules, as the anhydrous ammonia introduced directly into the granulator (e.g., via spray nozzles, as discussed further hereinbelow) has a very low temperature (e.g., about −28° F. (−33.3° C.)).

Granulator 20/120 may be tilted, for example, at an angle of about 1-3 degrees. In embodiments, granulator 20/120 is tilted at an angle of about 1, 2, 2.5, or 3 degrees. In this manner, ammonium sulfate granules in the drum are displaced down the incline by injection of the granule feed. The granules introduced at the feed end move towards the discharge end. Sparger ammonia addition not only controls the moisture and the quality of granulation, but also the nitrogen content of the final product.

Granulator 20/120 is fluidly connected with PCR 10/110, such that PCR product slurry comprising ammonium sulfate can be introduced thereto. As mentioned hereinabove, PCR product may be sprayed onto a bed of ammonium sulfate granules within granulator 20/120 via PCR outlets/PCR product sparger 11A/111A. PCR outlets/PCR product sparger 11A/111A may comprise any suitable number of outlets/sparger nozzles configured to distribute ammonium sulfate from PCR 10/110 evenly on a bed of ammonium sulfate (e.g., onto a rolling, circulating, and/or rotating bed of ammonium sulfate) within granulator 20/120. In embodiments, PCR outlets/PCR product sparger 11A/111A comprises from about 2 to about 10, from about 2 to about 8, or from about 3 to about 4 outlets/sparger nozzles. In embodiments, granulator 20/120 is designed such that PCR product from PCR 10/110 is introduced into granulator 20/120 at a vertical level at or below the midpoint thereof. PCR outlets/PCR product sparger 11A/111A may be configured to introduce PCR product into granulator 20/120 at least or substantially a downward direction.

Granulator 20/120 is fluidly connected with anhydrous ammonia inlet line 6/106 configured for the introduction of anhydrous ammonia thereto. In embodiments, anhydrous ammonia is introduced into granulator 20/120 as primarily a gas, a liquid, or a combination thereof. In embodiments, anhydrous ammonia is introduced into granulator 20/120 as a primarily liquid (i.e., aqueous) solution. An ammonia sparger 12/112 may be fluidly connected with anhydrous ammonia inlet line 6/106, and configured to introduce anhydrous ammonia into granulator 20/120 via a plurality of sparger nozzles. Ammonia sparger 12/112 may comprise any suitable number of sparger nozzles configured to distribute anhydrous, liquid ammonia evenly on the ammonium sulfate bed (e.g., onto a rolling, circulating, and/or rotating bed of ammonium sulfate) within granulator 20/120. In embodiments, ammonia sparger 12/112 comprises from about 10 to about 100, from about 20 to about 90, or from about 40 to about 80 sparger nozzles. As indicated in the embodiments of FIGS. 1 and 2A-2C, ammonia sparger 12/112 may be configured to introduce anhydrous ammonia into granulator 20/120 at a location below the location at which PCR outlets/PCR product sparger 11A/111A introduce PCR product thereto. Ammonia sparger 12/112 may be configured to introduce anhydrous ammonia into granulator 20/120 in at least or substantially an upward direction.

As noted hereinabove, the herein-disclosed ammonium sulfate production system is configured such that least or equal to 5, 10, 15, 20, 30, or 40 weight percent of the total anhydrous ammonia required for ammoniation of the sulfuric acid to be neutralized is added directly to the granulator. As noted hereinabove, such introduction of a portion of the anhydrous ammonia directly into the (e.g., circulating bed of a rotary-type) granulator (rather than introducing the entirety of the anhydrous ammonia via the pipe cross reactor), enhances solidification of the ammonium sulfate granules, as the anhydrous ammonia introduced directly into the granulator (e.g., via spray nozzles) has a very low temperature (e.g., about −28° F. (−33.3° C.)). The quench cooling effected by spraying of a portion of the anhydrous ammonia directly into the granulator may serve to control some of the exothermic ammoniation reaction, and reduce the amount of water in the 'wet' granulator product (e.g., to a moisture content in the range of from about 2.0 to about 6.0 weight percent moisture, as discussed further hereinbelow). In embodiments, from about 5 to about 50, from about 10 to about 40, or from about 30 to about 40 weight percent of the total stoichiometric amount of anhydrous ammonia required for ammoniation of the sulfuric acid to be neutralized is added directly to granulator 20/120, via granulator liquid ammonia inlet line 6/106. In embodiments, not less than 5 weight percent and not more than 50 weight percent of the total stoichiometric amount of anhydrous ammonia required is injected as a liquid through ammonia sparger 12/112 directly onto the ammonium sulfate bed within granulator 20/120. In embodiments, not less than 10 weight percent and not more than 40 weight percent of the total stoichiometric amount of anhydrous ammonia required is injected as a liquid through ammonia sparger 12/112 directly onto the ammonium sulfate bed within granulator 20/120.

As noted hereinabove, granulator 20/120 is configured to produce a desired ammonium sulfate granule via contact of the PCR product ammonium sulfate with recycled, 'seed' material ammonium sulfate. The seed material grows larger from the input of the ammonium sulfate from the pipe cross reactor. Granulator 20/120 is thus fluidly connected with one or more seed material inlet lines 21/121 configured for the introduction of ammonium sulfate seed material from the processing equipment. For example, as indicated in the embodiment of FIG. 1, dust and recycle cyclone(s) 45B, dryer cyclone(s) 45A, dryer elevator 35, or a combination thereof may be fluidly connected with granulator 20 via one or more recycle lines 21, whereby at least a portion of the ammonium sulfate (e.g., undersized ammonium sulfate granules, ammonium sulfate dust, and/or on-size product) extracted from granulator 20 via granulator product outlet line 25 may be recycled thereto.

In the embodiment of FIGS. 2A-2C, recycle elevator 152 is fluidly connected with granulator 120 via ammonium sulfate seed material recycle line 121, such that at least a portion of the ammonium sulfate (e.g., as discussed further hereinbelow, undersized ammonium sulfate granules in undersized ammonium sulfate granule outlet line 148, ammonium sulfate dust from dryer cyclone 145A and/or equipment dust cyclone 145B (which may be connected with recycle elevator 152 via a dust screw (and gas/solid separator(s) solids recycle line 154 in FIGS. 2A-2C), milled oversized product in milled product line 146A, and/or on-size product in recycle on-size product line 147A) extracted from granulator 120 via granulator product outlet line 125 may be recycled thereto. In embodiments, seed material recycle line(s) 21/121 are configured to introduce ammonium sulfate seed material to an upper portion (e.g., within the top 10, 15, or 20 percent of the vertical height) of granulator 20/120. In embodiments, seed material recycle line(s) 21/121 are configured to introduce ammonium sulfate seed material to the feed end of granulator 20/120. In embodiments, seed material recycle line(s) 21/121 are configured to introduce ammonium sulfate seed material above the introduction of PCR ammonium sulfate product to granulator 20/120 (e.g., above PCR outlets/PCR product sparger 11A/111A). In embodiments, seed material recycle line(s) 21/121 are configured to introduce ammonium sulfate seed material above the introduction of additive to granulator 20/120 (e.g., above additive sparger 116). As discussed further hereinbelow, proper selection of the size of the seed material can minimize the production of over- and undersized ammonium sulfate granules. In embodiments, the seed ammonium sulfate recycled to granulator 20/120 has a SGN in the range of from about 50 to about 500, from about 100 to about 400, or from about 250 to about 350.

As noted hereinabove, granulator 20/120 may be configured to contact the PCR product ammonium sulfate with additional anhydrous ammonia and a bed of ammonium sulfate granules (e.g., recycled seed material and granulating ammonium sulfate) in the presence of one or more additives. The one or more additives may be selected to improve one or more property of the ammonium sulfate product, including, but not limited to, the size guide number, the pill characteristics, the micronutrients, and/or the hardness thereof. In embodiments, the additive comprises an alum. In embodiments, the additive comprises aluminum sulfate.

In embodiments, granulator 20/120 is fluidly connected with an additive inlet line 115, whereby an additive may be introduced thereto. For example, in the embodiment of FIG. 2A, granulator 120 is fluidly connected with additive inlet line 115, whereby additive may be introduced into granulator 120. Additive inlet line 115 may be fluidly connected with additive sparger 116, positioned within granulator 120, and configured to spray the additive onto the (e.g., rotating) bed of ammonium sulfate granules therein. Additive sparger 116 may comprise any suitable number of sparger nozzles configured to distribute additive evenly on the ammonium sulfate bed (e.g., onto a rolling, circulating, and/or rotating bed of ammonium sulfate) within granulator 20/120. In embodiments, additive sparger 116 comprises from about 1 to about 4, from about 1 to about 3, or 1 or 2 sparger nozzles. Additive sparger 116 may be configured to introduce additive to granulator 120 at a position above the introduction of PCR product via PCR product sparger 111A (and thus also above the introduction of liquid, anhydrous ammonia via ammonia sparger 112), and/or below the introduction of recycled seed material via recycle seed material inlet line 121. In embodiments, Additive sparger 116 may be configured to introduce additive into granulator 20/120 at least or substantially in a downward direction.

In embodiments, such as ammonium sulfate production systems IIB and IIC of FIGS. 2B and 2C, respectively, an additive storage tank 115A is configured for the storage of additive in line 115. In the embodiment of FIG. 2B, additive storage tank 115A is fluidly connected, via additive tank outlet line 115B, with ammonia sump tank liquid outlet line 185B, whereby additive can be introduced into PCR feed tank 186. In the embodiment of FIG. 2C, additive storage tank 115A is fluidly connected, via additive tank outlet line 115B and PCR scrubber liquor feed inlet line 105C, with PCR 110, whereby additive can be introduced thereto.

The herein-disclosed ammonium sulfate production system may be configured to provide sufficient additive (e.g., alum, aluminum sulfate) such that the product ammonium sulfate granules have a hardness (as measured by IFDC S-115) in the range of from about 5 to about 15 pounds, from about 8 to about 14 pounds, or from about 10 to about 12 pounds. In embodiments, the system is configured to provide product ammonium sulfate granules having a size guide number (SGN) in the range of from about 200 to about 380, from about 250 to about 350, or from about 280 to about 320, as discussed further hereinbelow. In embodiments, the system is configured for operation with an additive (e.g., alum, aluminum sulfate, etc.) concentration in the range of from about 0.1 to about 0.7 weight percent, from about 0.1 to about 0.5 weight percent, or from about 0.2 to about 0.4 weight percent. In embodiments, the ammonium sulfate product extracted from the herein-disclosed system and method comprises from about 0.1 to about 0.7 weight percent aluminum, from about 0.1 to about 0.5 weight percent aluminum, or from about 0.2 to about 0.4 weight percent aluminum.

Granulator 20/120 is fluidly connected with a granulator product outlet line 25/125 configured for the extraction therefrom of granulator product comprising ammonium sulfate. As indicated in the embodiments of FIGS. 1 and 2A-2C, granulator product outlet line 25/125 may be positioned substantially at or below the vertical center of granulator 20/120.

Granulator vapor extraction line 26/126 is configured to extract a gaseous/vapor stream from granulator 20/120. Desirably, granulator 20/120 is operated under conditions whereby a majority of the excess water and unreacted anhydrous ammonia therein is extracted via granulator vapor extraction line 26/126. Desirably, the temperature of the PCR product introduced into granulator 20/120 via PCR outlets/PCR product sparger 11A/111A is high enough that excess water rapidly evaporates as the PCR product solution is sprayed onto the bed of ammonium sulfate granules within granulator 20/120. In embodiments, the temperature of the PCR product introduced into granulator 20/120 is greater than or equal to about 200° F. (93.3° C.), 250° F. (121.1° C.), or 300° F. (148.9° C.). In embodiments, the temperature within granulator 20/120 is greater than or equal to about 200° F. (93.3° C.), 250° F. (121.1° C.), or 300° F. (148.9° C.). In embodiments, the temperature within granulator 20/120 is in the range of from about 200° F. (93.3° C.) to about 450° F. (232.2° C.), from about 250° F. (121.1° C.) to about 400° F. (204.4° C.), or from about 250° F. (121.1° C.) to about 300° F. (148.9° C.). In embodiments, granulator 20/120 is operated at a pressure of less than or equal to about 14.7 psi (atmospheric pressure), 10, 9, 8, 7, 6, 5, 4, 3, 2, or 1 psi. In this manner, unreacted ammonia will exit granulator 20/120 via granulator vapor outlet line 26/126/126A/126', rather than with the granulator product ammonium sulfate. In embodiments, granulator 20/120 is configured such that the granulator product extracted therefrom via granulator product outlet line 25/125 comprises less than or equal to about 7, 6, 5, or 4 weight percent water. In embodiments, granulator 20/120 is configured such that the granulator product extracted therefrom via granulator product outlet line 25/125 comprises from about 0 to about 6, from about 2 to about 5, or from about 2 to about 4 weight percent water.

As indicated in the embodiment of FIG. 2B, granulator vapor extraction line 126 may fluidly connect granulator 120 with ammonia scrubber 164, via line 126B, whereby at least a portion of the granulator offgas can be introduced into granulator scrubber 164, while granulator vapor extraction line 126 may also fluidly connect granulator 120 with granulator scrubber offgas line 167, via line 126C, whereby at least a portion of the granulator offgas may be combined with gas exiting ammonia scrubber 164, and introduced via recycle cooler and granulator primary scrubber inlet line 168 into recycle cooler and granulator primary scrubber 169B. Still referring to the embodiment of FIG. 2B, a granulator offgas line 126A may fluidly connect granulator 120 with equipment dust cyclone offgas line 159B, whereby granulator offgas may be combined with gas exiting equipment dust cyclone(s) 145B, and introduced via gas transport line 162 and recycle cooler and granulator primary scrubber inlet line 168 into recycle cooler and granulator primary scrubber 169B.

As indicated in the embodiment of FIG. 2C, a granulator offgas line 126' may fluidly connect granulator 120 with granulator scrubber offgas line 167, whereby granulator offgas may be combined with gas exiting ammonia scrubber 164, and introduced via recycle cooler and granulator primary scrubber inlet line 168 into recycle cooler and granulator primary scrubber 169B.

One or more air inlet lines may be configured to introduce air (e.g., atmospheric air) into granulator 20/120. For example, in the embodiment of FIGS. 2A and 2B, granulator air inlet line 107A is configured to introduce air into granulator 120 through an open area at the front of the drum. Granulator air inlet line 107A may be configured to introduce air into an upper region of granulator 120. Granulator air inlet line 107A may be configured to introduce air into the feed end of granulator 120. Such introduction of air may be utilized to effect removal of steam/ammonia from granulator 120.

Processing Equipment.

As noted hereinabove, the ammonium sulfate production system of this disclosure may further comprise processing equipment, which may also be referred to herein as 'downstream processing equipment.' Such processing equipment may be configured to separate product ammonium sulfate granules (e.g., having desired characteristics, such as, but not necessarily limited to a desired granule size) from the granulator product, for providing seed material for recycle to the granulator, and/or for recycling ammonia and/or sulfuric acid to the pipe cross reactor, to the granulator, or both. As discussed further hereinbelow, such processing equipment may comprise one or more apparatus selected from dryers, belts/conveyors, elevators, magnets, coolers, sizing screens, gas/solid separators (e.g., cyclones, baghouses, and the like), scrubbers, tanks (e.g., sump tanks, water tanks, feed storage tanks, additive tanks, and the like), mills, splitters/diverters, pumps, fans, and the like.

Potential components of the processing equipment will be described in more detail hereinbelow with reference to FIGS. 2A-2C. In embodiments, the herein disclosed ammonium sulfate production system comprises at least one dryer. In embodiments, the herein disclosed ammonium sulfate production system comprises at least one magnet. In embodiments, the herein disclosed ammonium sulfate production system comprises at least one elevator. In embodiments, the herein disclosed ammonium sulfate production system comprises at least one elevator selected from dryer discharge elevators, screen elevators, product elevators, and seed ammonium sulfate recycle elevators. In embodiments, the herein disclosed ammonium sulfate production system comprises at least one sizing screen. In embodiments, the herein disclosed ammonium sulfate production system comprises at least two or at least three sizing screens, providing on-size (or 'product') ammonium sulfate granules, undersized ammonium sulfate granules, and oversized ammonium sulfate granules. In embodiments, the herein disclosed ammonium sulfate production system comprises at least one mill. In embodiments, the herein disclosed ammonium sulfate production system comprises at least one cooler. In embodiments, the herein disclosed ammonium sulfate production system comprises at least one product cooler. In embodiments, the herein disclosed ammonium sulfate production system comprises at least one gas/solid separator. In embodiments, the herein disclosed ammonium sulfate production system comprises at least one cyclone. In embodiments, the herein disclosed ammonium sulfate production system comprises at least one cyclone selected from dryer cyclones, and dust cyclones. In embodiments, the herein disclosed ammonium sulfate production system comprises at least one baghouse. In embodiments, the herein disclosed ammonium sulfate production system comprises at least one scrubber. In embodiments, the herein disclosed ammonium sulfate production system comprises at least one scrubber selected from granulator scrubbers, dryer primary scrubbers, recycle cooler and granulator primary scrubbers, dryer tailgas scrubbers, and recycle cooler and granulator tail gas scrubbers. In embodiments, the herein disclosed ammonium sulfate production system comprises at least one sump tank. In embodiments, the herein disclosed ammonium sulfate production system comprises at least one sump tank selected from primary scrubbers (or 'dust') sump tanks, dryer/recycle tailgas scrubber sump tanks, and ammonia scrubber (or 'granulator scrubber) sump tanks. In embodiments, the herein disclosed ammonium sulfate production system comprises at least one feed tank. In embodiments, the herein disclosed ammonium sulfate production system comprises at least one PCR feed tank. In embodiments, the herein disclosed ammonium sulfate production system comprises at least one additive storage tank. In embodiments, the herein disclosed ammonium sulfate production system comprises at least one water storage tank. In embodiments, the herein disclosed ammonium sulfate production system comprises at least one conveyor. In embodiments, the herein disclosed ammonium sulfate production system comprises at least one conveyor selected from conveyor belts, screw conveyors, and belt scale conveyors. In embodiments, the herein disclosed ammonium sulfate production system comprises at least one conveyor selected from dryer discharge conveyors, screen elevator conveyors, screen feed conveyors, product conveyors, cooled product belt scale conveyors, screen screw conveyors, and dust screw conveyors.

Dryer 30/130.

As noted hereinabove, in embodiments, the downstream processing equipment comprises one or more dryers. For example, the herein disclosed ammonium sulfate production system may comprise a dryer 30/130 configured to remove moisture from the 'wet' ammonium sulfate product extracted from granulator 20/120 via granulator product outlet line 25/125. Dryer 30/130 may be any dryer known in the art to be suitable for a reduction in the moisture content of the 'wet' granulator product introduced thereto via granulator product outlet line 25/125. In embodiments, dryer 30/130 is a rotary dryer.

Because the granulator and the PCR are configured for operation with anhydrous ammonia (e.g., anhydrous, liquid ammonia), the total usage of fuel gas (e.g., natural gas) required in dryer 30/130 to evaporate excess moisture from the 'wet' ammonium sulfate product introduced thereto via granulator product outlet line 25/125 is minimized and/or reduced relative to conventional applications. In embodiments, less than or equal to about 0.08, 0.07, 0.06, 0.05, or 0.04 MMBTU of fuel gas is required per ton of dried ammonium sulfate production. In embodiments, from about 0.04 to about 0.08, from about 0.05 to about 0.07, or from about 0.03 to about 0.10 MMBTU of fuel gas is required per ton of dried ammonium sulfate extracted from dryer 30/130.

A dryer inlet line 9/109 is configured to introduce air (e.g., ambient air) from combustion air inlet line 7/107B and fuel gas from line 8/108 into dryer 30/130. The fuel gas may comprise any suitable fuel gas, for example, natural gas. One or more burner(s) 13 may be configured to combust the fuel gas, thus providing heat for the dryer 30/130. Within dryer 30/130, the moisture content of the 'wet' granulator product introduced thereto via granulator product outlet line 25/125 is reduced, providing a 'dry' or 'hot' granulator product. A dryer granule product outlet line 32/132 is configured to remove dried ammonium sulfate granules from dryer 30/130. In embodiments, the 'wet' granulator product introduced into dryer 30/130 via granulator product outlet line 25/125 has a moisture content of greater than or equal to about 1, 2, 3, 4, 5, 6, or 7 weight percent, and the dried ammonium sulfate granules extracted from dryer 30/130 via dryer granule outlet line 32/132 have a moisture content of less than or equal to about 7, 6, 5, 4, 3, 2, or 1 weight percent. For example, in embodiments, the wet granulator product has a moisture (e.g., water) content of greater than or equal to about 4 weight percent, and the dried ammonium sulfate granules have a moisture (e.g., water) content of less than or equal to about 1 weight percent. In embodiments, the dried ammonium sulfate granules extracted from dryer 30/130 via dryer granule outlet line 32/132 have a moisture content in the range of from about 0 to about 5 weight percent. In embodiments, the 'wet' granulator product introduced into dryer 30/130 via granulator product outlet line 25/125 has a moisture content in the range of from about 4 to about 6 weight percent. Dryer granule product outlet line 32/132 may fluidly connect dryer 30/130 with a dryer elevator 35/135/135A.

A dryer gas outlet line 31/131 is configured to extract gas and entrained dust from dryer 30/130. Dryer gas outlet line 31/131 may fluidly connect dryer 30/130 with one or more dryer cyclones 45A/145A.

Magnet 33.

As noted hereinabove, in embodiments, the downstream processing equipment comprises at least one magnet. For example, as indicated in the embodiment of FIG. 1, a magnet 33 may be positioned on dryer granule product outlet line 32/132. Magnet 33 may be configured for removal of carbon steel and/or other magnetic materials (i.e., metals) inadvertently present in the dried granule product, to minimize/prevent downstream damage to conveyors and/or other processing equipment.

Elevators.

As noted hereinabove, in embodiments, the downstream processing equipment comprises at least one elevator. In embodiments, the herein-disclosed ammonium sulfate production system comprises at least one elevator selected from dryer discharge elevators, screen elevators, product elevators, and recycle elevators.

Dryer Discharge Elevator 35/135/135A.

The herein-disclosed ammonium sulfate production system may further comprise a dryer discharge elevator 35/135/135A. Dryer discharge elevator 35/135/135A is fluidly connected with dryer 30/130 via dried granule product outlet line 32/132. A conveyor belt 134 may be configured to introduce dried granule product into dryer discharge elevator 35/135/135A. Dryer discharge elevator 135 of FIGS. 2A and 2B is configured to convey dried granule product to screen elevator 140. Dryer discharge elevator 35/135 may be fluidly connected with a screen elevator 140 via dryer discharge elevator outlet line 36/136.

In the embodiment of FIG. 2C, extended dryer discharge elevator 135A is fluidly connected with screens 144 via dryer discharge elevator outlet line 136A, screen feed conveyor 143A, 3-way splitter 194, and screen feed lines 195A-195C. A dryer discharge elevator dust outlet line 141A may be configured to extract gas comprising entrained dust (e.g., comprising ammonium sulfate fines) from dryer discharge elevator 135A.

Screen Elevator 140.

As indicated in the embodiments of FIGS. 2A and 2B, and mentioned hereinabove, the herein-disclosed ammonium sulfate production system may further comprise a screen elevator 140. Screen elevator 140 may be fluidly connected with dryer discharge elevator 35/135 via dryer discharge elevator outlet line 36/136. A conveyor belt 137 may be configured to introduce ammonium sulfate extracted from dryer discharge elevator 135 into screen elevator 140. Screen elevator 140 is configured to convey material for screening. A screen elevator dust outlet line 141 may be configured to extract gas comprising entrained dust (e.g., comprising ammonium sulfate fines) from screen elevator 140.

Product Elevator 190.

As indicated in the embodiment of FIGS. 2A-2C, and mentioned hereinabove, the herein-disclosed ammonium sulfate production system may further comprise a product elevator 190. Product elevator 190 may be fluidly connected with product cooler 149 (discussed further hereinbelow) via a product cooler ammonium sulfate granule product outlet line 187, a belt scale 188, and/or product elevator inlet line 189. Product elevator 190 is configured to convey the product. A product elevator outlet line 191 is configured for the extraction of product from product elevator 190. A conveyor belt 192 positioned on product elevator outlet line 191 may be configured to transport the ammonium sulfate granule product, for example, to a warehouse 193.

As indicated in the embodiment of FIG. 2C, an ammonium sulfate production system of this disclosure may further comprise polishing screen 196 configured to polish the product extracted from product elevator 190 via product elevator outlet line 191. A fines line 196A may be configured to extract fines from polishing screen 196, while a polished product line 196B may be configured for the removal of polished product therefrom. A diverter 197 may be configured to divert a first portion of the polished product to be combined via line 197A with the fines extracted from polishing screen 196 via fines line 196A; and to divert a second portion of polished product to product conveyor 192 via line 197B. The first diverted portion in line 197A, and the fines in line 196A may be fluidly connected via recycle line 198 with dryer discharge conveyor belt 134 (or with screen elevator conveyor 137 if incorporated into the embodiment of FIG. 2A or 2B), whereby fines extracted in polishing screen 196 and diverted polished product may be recycled to sizing screens 144.

Recycle Elevator 152.

As indicated in the embodiments of FIGS. 2A-2C, and mentioned hereinabove, the herein-disclosed ammonium sulfate production system may further comprise a recycle elevator 152. Recycle elevator 152 may be fluidly connected with sizing screens 144 (discussed further hereinbelow), whereby oversized ammonium sulfate granules (via oversized ammonium sulfate granule outlet line 146, mill(s) 150, and recycle elevator inlet line 151), undersized ammonium sulfate granules (via undersized ammonium sulfate granule outlet line 148, and recycle elevator inlet line 151), and/or on-size ammonium sulfate granules (via on-size ammonium sulfate granule product outlet line 147, recycle on-size product line 147A, and recycle elevator inlet line 151) can be introduced thereto. Recycle elevator 152 is configured to convey material to be recycled back to the granulator. A recycle elevator dust outlet line 155 may be configured to extract gas comprising entrained dust (e.g., comprising ammonium sulfate fines) from recycle elevator 152.

Sizing Screens.

As noted hereinabove, in embodiments, the downstream processing equipment comprises at least one sizing screen. As indicated in the embodiments of FIGS. 2A and 2B, sizing screen(s) 144 may be fluidly connected with screen elevator 140 via screen elevator outlet line 142 and/or screw feeder 143. In the embodiment of FIG. 2C, sizing screen(s) 144 is fluidly connected with modified dryer discharge elevator 135A via dryer discharge elevator outlet line 136A, screen conveyor 143A, 3-way splitter 194, and screen feeder inlet lines 195A-195C. In this embodiment, 3-way splitter 194 may be configured to introduce portions of the dryer discharge outlet material to two, three, or more screens of sizing screens 144. In embodiments, 3-way splitter 194 separates the dryer discharge outlet material into three streams, which are fed via screen inlet lines 195A, 195B, and 195C to three sizing screens.

In embodiments, the herein disclosed ammonium sulfate production system comprises at least two or at least three sizing screens, providing on-size (or 'product') ammonium sulfate granules, undersized ammonium sulfate granules, and oversized ammonium sulfate granules. In embodiments, the herein-disclosed ammonium sulfate system comprises at least two sizing screens. In embodiments, the herein-disclosed ammonium sulfate system comprises at least three sizing screens. In embodiments, the herein-disclosed ammonium sulfate production system comprises a first screen configured to allow granules less than a first size to pass therethrough and to retain 'oversize' granules greater than this first size, a second screen configured to allow particles less than a second size (undersized' granules') to pass therethrough and to retain 'on-size' granules greater than this second size. In embodiments, the first size is greater than or equal to about 3.5 mm, 4 mm, or 5 mm. In embodiments, the second size is less than or equal to about 2 mm, 1.5 mm, or 1 mm. In embodiments, on-size or 'product' ammonium sulfate granules have a SGN in the range of from about 200 to about 380, from about 250 to about 350, or from about 280 to about 320. The oversized ammonium sulfate granules have a largest dimension that is greater than that of the on-size product ammonium sulfate granules. In embodiments, the oversized ammonium sulfate granules have a largest dimension (e.g., diameter for substantially spherical particles) of greater than or equal to about 3.5 mm, 4 mm, or 5 mm. The undersized ammonium sulfate granules have a largest dimension (e.g., diameter for substantially spherical particles) that is less than that of the on-size product ammonium sulfate granules. In embodiments, the undersized ammonium sulfate granules have a largest dimension (e.g., diameter for substantially spherical particles) of less than or equal to about 1 mm, 1.5 mm, or 2.0 mm. For example, in embodiments, the system comprises a first or 'oversize' 160 mesh screen, which retains oversize granules having a size of greater than 4 mm; and a second or 'product' screen, through which undersize granules having a size of less than 2.25 mm pass.

As noted hereinabove, sizing screens 144 may be fluidly connected with recycle elevator 152, such that all or at least a portion of the oversized ammonium sulfate granules, the on-size or product ammonium sulfate granules, and/or the undersized ammonium sulfate granules can be recycled as seed material to the granulator. For example, portions or all of the oversized ammonium sulfate granules may be introduced into mill(s) 150 via oversized granule screen outlet line 146, milled, and subsequently introduced into recycle elevator inlet line 151 via milled oversized granule line 146A. Portions or all of on-size product ammonium sulfate granules can be introduced into recycle elevator inlet line 151 via on-size product screen outlet line 147, and recycle on-size product line 147A. Portions or all of undersized product ammonium sulfate granules can be introduced into recycle elevator inlet line 151 via undersize product screen outlet line 148. A valve V1 may be utilized to control the amount of on-size ammonium sulfate granules sent to product cooler 149 via non-recycle on-size product line 147B and conveyor belt 157. A sizing screen(s) dust outlet line 156 may be configured to extract dust (e.g., gas comprising entrained ammonium sulfate fines) from sizing screens 144.

In embodiments, the system is configured such that the total amount of ammonium sulfate (e.g., on-size, oversize, and/or undersize ammonium sulfate) recycled to the granulator as seed material is from about 2 to about 8 times, from about 3 to about 5 times, or from about 3.5 to about 4.5 times, by weight, of the amount of product extracted. That is, in embodiments, the amount of ammonium sulfate recycled to the granulator via recycle elevator inlet line 151 is in the range of from about 2 to about 6 times, from about 3 to about 5 times, or in the range of from about 3.5 to about 4.5 times, by weight, of the amount of on-size ammonium sulfate product extracted via non-recycle on-size product line 147B.

Mill(s) 150.

As noted hereinabove, in embodiments, the herein disclosed ammonium sulfate production system comprises at least one mill. Any mill known in the art to be suitable for grinding/reducing the size of the oversized ammonium sulfate granules can be utilized. In embodiments, mill(s) 150 comprises a chain mill. In embodiments, the herein-disclosed ammonium sulfate production system comprises a mill positioned on oversized ammonium sulfate granule screen outlet line 146, and configured to reduce the size of the oversized granules prior to recycle to granulator 20/120. Alternatively or additionally, mill(s) 150 may serve to reduce the size of the oversized granules prior to recycle to sizing screens 144. Thus, milled product line 146A may fluidly connect mill(s) 150 with recycle elevator inlet line 151, and/or may fluidly connect mill(s) 150 with sizing screens 144, whereby the milled product in milled product line 146A can be re-screened. The SGN of the ammonium sulfate product from the granulator can be adjusted via appropriate milling/grinding of the oversized ammonium sulfate granules, and providing seed material of appropriate size (e.g., appropriate SGN) to the granulator. Proper selection of seed material can minimize the amount of undersized (i.e., 'fines') and oversized ammonium sulfate granules produced via the herein-disclosed system and method.

Cooler 149. In embodiments, the herein disclosed ammonium sulfate production system comprises at least one cooler. In embodiments, the herein disclosed ammonium sulfate production system comprises at least product cooler. In the embodiment of FIGS. 2A-2C, systems IIA-IIC comprise a product cooler 149. Product cooler 149 is configured to cool and/or dedust the on-size, product ammonium sulfate granules screened out in sizing screens 144, and introduced into product cooler 149 via non-recycle on-size product ammonium sulfate granule line 147B. A conveyor belt 157 may serve to introduce on-size product ammonium sulfate from sizing screens 144 into product cooler 149.

In embodiments, cooler 149 is configured to reduce the temperature of the on-size product ammonium sulfate granules introduced thereto to about ambient temperature. In embodiments, cooler 149 is configured to reduce the temperature of the on-size product ammonium sulfate granules introduced thereto to a temperature in the range of from about 90° F. (32.2° C.) to about 120° F. (48.9° C.). Product cooler 149 may be configured for dedusting of the on-size, product ammonium sulfate granules introduced thereto. In embodiments, a product cooler air inlet line 107C is configured to introduce air into product cooler 149, and/or a deduster inlet line 102 is configured to introduce a deduster into product cooler 149. The deduster may minimize product setup and/or maintain desiccation of the product ammonium sulfate granules. In embodiments, the deduster is glycerin-based. The deduster may provide for an ammonium sulfate granule product that has a shelf life of more than 5, 6, 7, 8, 9, or 10 months. The deduster may provide for an ammonium sulfate granule product that has a shelf life of at least 6-12 months.

A product cooler gas outlet line 161 may be configured for the extraction of gaseous material from product cooler 149. Such gaseous material extracted via product cooler gas outlet line 161 may comprise air, steam, and/or dust.

Gas/Solid Separators.

As noted hereinabove, in embodiments, the herein disclosed ammonium sulfate production system comprises at least one gas/solid separator. In embodiments, the herein disclosed ammonium sulfate production system comprises at least one cyclone. In embodiments, the herein disclosed ammonium sulfate production system comprises at least one baghouse. In embodiments, such as that of FIGS. 1 and 2A-2C, the herein disclosed ammonium sulfate production system comprises at least one cyclone selected from dryer cyclones, and dust cyclones. In embodiments, the ammonium sulfate production system comprises two dryer cyclones, two dust cyclones, or both two dust cyclones and two dryer cyclones.

Dryer Cyclone(s) 45A/145A.

In embodiments, the herein-disclosed ammonium sulfate production system comprises one or more dryer cyclones configured to separate solids (e.g., ammonium sulfate-containing dust) from the dryer offgas introduced thereto. For example, in the embodiment of FIG. 1, system I comprises dryer cyclone 45A, and in the embodiment of FIGS. 2A-2C, systems IIA-IIC comprise dryer cyclone 145A. Dryer cyclone 45A/145A is fluidly connected with dryer 30/130 via dryer gas outlet line 31/131. A dryer cyclone solids outlet line 153A is configured to extract solids from dryer cyclone 145A. Dryer solids may be recycled to granulator 20/120, for example via solids recycle line 154, a dust screw, and recycle elevator 152. A dryer cyclone gas outlet line 159A may be configured for the extraction of solids-reduced dryer gas from dryer cyclone 145A.

Equipment Dust Cyclone(s) 45B/145B.

In embodiments, the herein-disclosed ammonium sulfate production system comprises one or more equipment dust cyclones configured to separate solids (e.g., ammonium sulfate-containing dust) from the gas introduced thereto. For example, in the embodiment of FIG. 1, system I comprises dust cyclone 45B, and in the embodiment of FIGS. 2A-2C, systems IIA-IIC comprise dust cyclone 145B. As indicated in the embodiment of FIG. 2A, dust cyclone 145B may be fluidly connected with screen elevator 140 via screen elevator gas outlet line 141 and dust cyclone inlet line 158; may be fluidly connected with sizing screens 144 via sizing screen(s) dust outlet line 156 and dust cyclone inlet line 158; and/or may be fluidly connected with recycle elevator 152 via recycle elevator gas outlet line 155 and dust cyclone inlet line 158. As indicated in the embodiments of FIGS. 2B and 2C, dust cyclone 145B may be fluidly connected with product cooler 149 via product cooler gas outlet line 161 and dust cyclone inlet line 158. A dust cyclone solids outlet line 153B is configured to extract solids from equipment dust cyclone 145B. Dryer solids may be recycled to granulator 20/120, for example via solids recycle line 154, a dust screw, and recycle elevator 152. A dust cyclone gas outlet line 159B may be configured for the extraction of solids-reduced equipment gas from equipment dust cyclone 145B.

Baghouse 199. As indicated in the embodiment of FIG. 2C, an ammonium sulfate production system of this disclosure may comprise one or more baghouse. System IIC comprises baghouse 199. Baghouse 199 is configured for the removal of fines from a portion of the gas extracted from equipment dust cyclone(s) 145B via line 159B and introduced thereto via baghouse inlet line 159W'. A baghouse solids outlet line 153C is configured to extract solids from baghouse 199. Dryer solids may be recycled to granulator 20/120, for example via gas/solid separator(s) recycle line 154, a dust screw, and recycle elevator 152. A line 159C may be configured for the extraction of solids-reduced gas/vapor from baghouse 199. A baghouse exhaust fan 200 may be operable to introduce baghouse exhaust gas to stack 201 for venting to the atmosphere.

Scrubbers.

In embodiments, the herein disclosed ammonium sulfate production system comprises at least one scrubber. In embodiments, the herein disclosed ammonium sulfate production system comprises at least one scrubber selected from granulator scrubbers, dryer primary scrubbers, recycle cooler and granulator primary scrubbers, dryer tailgas scrubbers, and recycle cooler and granulator tail gas scrubbers.

Granulator Scrubber(s) 164.

In embodiments, the herein-disclosed ammonium sulfate production system comprises a granulator scrubber (also referred to herein as an 'ammonia scrubber'). For example, in the embodiment of FIGS. 2A-2C, systems IIA-IIC comprise granulator scrubber 164. Granulator scrubber 164 is configured to scrub ammonia from the granulator vapor introduced thereto via granulator vapor extraction line 26/126. Any scrubber known in the art to be suitable for the scrubbing of ammonia may be utilized as granulator scrubber 164. A water or scrubber liquor recirculation line 165 may be configured to introduce water spray into the granulator vapor in granulator vapor extraction line 126. A granulator scrubber liquid outlet line 166 may be configured to extract liquid comprising scrubbed ammonia from granulator scrubber 164. A granulator scrubber offgas line 167 may be configured to extract gas from granulator scrubber 164.

Dryer Primary Scrubber 169A.

In embodiments, the herein-disclosed ammonium sulfate production system comprises a dryer primary scrubber. For example, in the embodiment of FIGS. 2A-2C, systems IIA-IIC comprise dryer primary scrubber 169A. Dryer primary scrubber 169A is configured to scrub ammonia and dust from the gas introduced thereto via dryer cyclone offgas line 159A. Any scrubber known in the art to be suitable for the scrubbing of ammonia and dust may be utilized as dryer primary scrubber 169A. A dryer primary scrubber liquid outlet line 172A may be configured to extract liquid comprising sulfuric acid from dryer primary scrubber 169A. A dryer primary scrubber tailgas line 170A may be configured to extract tailgas, optionally via dryer primary scrubber tailgas fan 171A, from dryer primary scrubber 169A.

Recycle Cooler and Granulator Primary Scrubber 169B.

In embodiments, the herein-disclosed ammonium sulfate production system comprises a recycle cooler and granulator primary scrubber. For example, in the embodiment of FIGS. 2A-2C, systems IIA-IIC comprise recycle cooler and granulator primary scrubber 169B. Recycle cooler and granulator primary scrubber 169B is configured to scrub ammonia and dust from the gas introduced thereto via recycle cooler and granulator primary scrubber inlet line 168. The gas in recycle cooler and granulator primary scrubber inlet line 168 comprises gas in transport line 162, and granulator scrubber offgas line 167. Transport line 162 is configured to introduce offgas extracted from equipment dust cyclone(s) 145B via equipment dust cyclone offgas line 159B in the embodiment of FIGS. 2A and 2B, a portion of the offgas extracted from equipment dust cyclone(s) 145B via equipment dust cyclone offgas line 159B and 159B' in the embodiment of FIG. 2C, gas extracted from product cooler 149 via product cooler gas outlet line 161 in the embodiment of FIG. 2A, and/or air from air inlet line 107D in the embodiment of FIG. 2A, and granulator offgas extracted from granulator 120 via granulator offgas line 126A in the embodiment of FIG. 2B, into recycle cooler and granulator primary scrubber 169B.

Any scrubber known in the art to be suitable for the scrubbing of ammonia and dust may be utilized as recycle cooler and granulator primary scrubber 169B. A recycle cooler and granulator primary scrubber liquid outlet line 172B may be configured to extract liquid comprising sulfuric acid from recycle cooler and granulator primary scrubber 169B. A recycle cooler and granulator primary scrubber tailgas line 170B may be configured to extract tailgas, optionally via recycle cooler and granulator primary scrubber tailgas fan 171B, from recycle cooler and granulator primary scrubber 169B.

Dryer Tailgas Scrubber 176A.

In embodiments, the herein-disclosed ammonium sulfate production system comprises a dryer tailgas scrubber. For example, in the embodiment of FIGS. 2A-2C, systems IIA-IIC comprise dryer tailgas scrubber 176A. Dryer tailgas scrubber 176A is configured to scrub ammonia and dust from the dryer primary scrubber tailgas introduced thereto via dryer primary scrubber tailgas line 170A. Any scrubber known in the art to be suitable for the scrubbing of ammonia and dust may be utilized as dryer tailgas scrubber 176A. A dryer tailgas scrubber liquid outlet line 182A may be configured to extract liquid comprising sulfuric acid from dryer tailgas scrubber 176A. A dryer tailgas scrubber offgas line 180A may be configured to extract gas, optionally via dryer tailgas scrubber offgas fan 181A, from dryer tailgas scrubber 176A.

Recycle Cooler and Granulator Tailgas Scrubber 176B.

In embodiments, the herein-disclosed ammonium sulfate production system comprises a recycle cooler and granulator tailgas scrubber. For example, in the embodiments of FIGS. 2A-2C, systems IIA-IIC comprise recycle cooler and granulator tailgas scrubber 176B. Recycle cooler and granulator tailgas scrubber 176B is configured to scrub ammonia and dust from the recycle cooler and granulator primary scrubber tailgas introduced thereto via recycle cooler and granulator primary scrubber tailgas line 170B. Any scrubber known in the art to be suitable for the scrubbing of ammonia and dust may be utilized as recycle cooler and granulator tailgas scrubber 176B. A recycle cooler and granulator tailgas scrubber liquid outlet line 182B may be configured to extract liquid comprising sulfuric acid from recycle cooler and granulator tailgas scrubber 176B. A recycle cooler and granulator tailgas scrubber offgas line 180B may be configured to extract gas, optionally via recycle cooler and granulator tailgas scrubber offgas fan 181B, from recycle cooler and granulator tailgas scrubber 176B.

Sump Tanks.

In embodiments, the herein disclosed ammonium sulfate production system comprises at least one sump tank. In embodiments, the herein disclosed ammonium sulfate production system comprises at least one sump tank selected from primary scrubbers (or 'dust') sump tanks, dryer/recycle tailgas scrubber sump tanks, and ammonia scrubber (or 'granulator scrubber') sump tanks.

Primary Scrubbers Sump Tank 175A.

The herein-disclosed ammonium sulfate production system may comprise a primary scrubbers sump tank. The primary scrubbers sump tank is configured to contain spent scrubber liquor, comprising sulfuric acid and water. For example, in the embodiment of FIGS. 2A-2C, systems IIA-IIC comprise primary scrubbers sump tank 175A. Primary scrubbers sump tank 175A may be configured for introduction thereto of spent scrubber liquid from dryer primary scrubber 169A via dryer primary scrubber liquid outlet line 172A, of spent scrubber liquid from recycle cooler and granulator primary scrubber 169B via recycle cooler and granulator primary scrubber liquid outlet line 172B, of concentrated sulfuric acid (e.g., comprising 100% sulfuric acid) from line(s) 114/114B, and/or of liquid from dryer/recycle tailgas scrubber sump tank 175B via dryer/recycle tailgas scrubber sump tank outlet flow line 183C.

A line 184 may be configured for the extraction of liquids from primary scrubbers sump tank 175A. A dryer granulator-primary scrubber recirculation flow line 184A may be configured to provide dryer-granulator-primary scrubber recirculation flow to enhance removal of dust and ammonia. A recycle cooler-preneutralizer-primary scrubber recirculation flow line 184B may be configured to provide recycle cooler-preneutralizer-primary scrubber recirculation flow to enhance removal of dust and ammonia. A primary scrubbers sump tank outlet flow line 184C may be configured to introduce at least a portion of the contents of primary scrubbers sump tank 175A into ammonia scrubber sump tank 175C.

Dryer/Recycle Tailgas Scrubber Sump Tank 175B.

The herein-disclosed ammonium sulfate production system may comprise a dryer/recycle tailgas scrubber sump tank. Dryer/recycle tailgas scrubber sump tank is configured to contain spent scrubber liquor, comprising sulfuric acid and water. For example, in the embodiment of FIGS. 2A-2C, system IIA comprises dryer/recycle tailgas scrubber sump tank 175B. Dryer/recycle tailgas scrubber sump tank 175B may be configured for introduction thereto of spent scrubber liquids from dryer tailgas scrubber 176A via dryer tailgas scrubber liquid outlet line 182A, of spent scrubber liquids from recycle cooler and granulator tailgas scrubber 176B via recycle cooler and granulator tailgas scrubber liquid outlet line 182B, of concentrated sulfuric acid (e.g., comprising 100% sulfuric acid) from line(s) 114/114C, and/or of plant water from plant water inlet line 101 (and, as indicated in FIGS. 2B and 2C, via recovered water inlet line 101A and water tank 101B). A line 183 may be configured for the extraction of liquids from dryer/recycle tailgas scrubber sump tank 175B. A recycle-preneutralizer-tailgas recirculation flow line 183A may be configured to provide recycle-preneutralizer-tailgas recirculation flow to enhance removal of dust and ammonia. A dryer-tailgas recirculation flow line 183B may be configured to provide dryer tailgas recirculation flow to enhance removal of dust and ammonia. As noted hereinabove, a dryer/recycle tailgas scrubber sump tank outlet flow line 183C may be configured to introduce at least a portion of the contents of dryer/recycle tailgas scrubber sump tank 175B into primary scrubbers sump tank 175A.

Ammonia Scrubber Sump Tank.

The herein-disclosed ammonium sulfate production system may comprise an ammonia scrubber (or 'granulator scrubber') sump tank. The ammonia scrubber sump tank is configured to contain spent scrubber liquor, comprising sulfuric acid and water. For example, in the embodiment of FIGS. 2A-2C, systems IIA-IIC comprise ammonia scrubber sump tank 175C. Ammonia scrubber sump tank 175C may be configured for introduction thereto of spent scrubber liquor from granulator scrubber 164 via granulator scrubber liquid outlet line 166, of liquids comprising sulfuric acid and water, from primary scrubbers sump tank 175A via primary scrubbers sump tank outlet flow line 184C, and/or of concentrated sulfuric acid (e.g., comprising 100% sulfuric acid) from line(s) 114/114A.

A line 185 may be configured for the extraction of liquids from ammonia scrubber sump tank 175C. A granulator scrubber recirculation flow line 185A and pump 202 may be configured to provide granulator scrubber recirculation flow to enhance removal of dust and ammonia. An ammonia sump tank liquid outlet line 185B may be configured to introduce at least a portion of the contents of ammonia scrubber sump tank 175C into PCR feed tank 186, which is discussed further hereinbelow.

Feed Tank(s).

In embodiments, the herein disclosed ammonium sulfate production system comprises at least one feed tank. In embodiments, the herein disclosed ammonium sulfate production system comprises at least one tank selected from PCR feed tanks, water tanks, and additive storage tanks.

In embodiments, the herein disclosed ammonium sulfate production system comprises at least one water tank, configured to hold recovered and/or fresh water. For example, in the embodiments of FIGS. 2B and 2C, ammonium sulfate production systems 2B and 2C comprise water holding or day tank 101B, configured for storage of recovered and/or fresh water introduced thereto via water inlet line 101A. Water tank 101B may be fluidly connected with dryer/recycle tailgas scrubber sump tank 175B.

In embodiments, the herein disclosed ammonium sulfate production system comprises at least one additive storage tank, configured to hold an additive (e.g., aluminum sulfate) for use in PCR 110. For example, in the embodiments of FIGS. 2B and 2C, ammonium sulfate production systems IIB and IIC comprise additive storage tank 115A. In the embodiment of FIG. 2B, additive storage tank 115A is fluidly connected with PCR feed tank 186 via additive storage tank outlet line 115B and ammonia sump tank liquid outlet line 185B. In the embodiment of FIG. 2C, additive storage tank 115A is fluidly connected with PCR 110 via additive storage tank outlet line 115B and PCR scrubber liquor feed inlet line 105C.

In embodiments, the herein disclosed ammonium sulfate production system comprises at least one PCR feed tank, configured to provide recycled scrubber liquor to PCR 10/110. As indicated in the embodiments of FIGS. 2A-2C, PCR scrubber liquor feed inlet line 105C fluidly connects PCR feed tank 186 and PCR 10/110, such that at least a portion of the contents of PCR feed tank 186 may be introduced into PCR 10/110.

Conveyors.

In embodiments, the herein disclosed ammonium sulfate production system comprises at least one conveyor. In embodiments, the herein disclosed ammonium sulfate production system comprises at least one conveyor selected from conveyor belts, screw conveyors, and belt scale conveyors. In embodiments, the herein disclosed ammonium sulfate production system comprises at least one conveyor selected from dryer discharge conveyors, screen elevator conveyors, screen feed conveyors, product conveyors, cooled product belt scale conveyors, screen screw conveyors, and dust screw conveyors. For example, in the embodiment of FIGS. 2A-2C, ammonium sulfate production systems IIA-IIC comprise dryer discharge conveyor 134 configured to introduce dryer discharge materials in dryer discharge outlet line 132 into dryer discharge elevator 135 (extended dryer discharge elevator 135A in FIG. 2C); screen elevator conveyor 137 configured to introduce dryer discharge elevator materials in dryer discharge elevator outlet line 136 into screen elevator 140 (in the embodiments of FIGS. 2A and 2B); product conveyor 192 configured to transport product ammonium sulfate granules extracted from product elevator 190; cooled product belt scale conveyor 188 configured to introduce cooled product extracted from product cooler 149 via cooled product outlet line 187 into product elevator 190 via line 189; screen screw conveyor 143 configured to introduce ammonium sulfate granules extracted from screen elevator 140 via screen elevator ammonium sulfate granule outlet line 142 into sizing screens 144 (in the embodiments of FIGS. 2A and 2B); screen feed conveyor 143A configured to introduce ammonium sulfate granules extracted from modified dryer discharge elevator 135A via dryer discharge elevator ammonium sulfate granule outlet line 136A into 3-way splitter 194 and thence to sizing screens 144 (in the embodiment of FIG. 2C); a dust screw conveyor 154 configured to introduce, via combined gas/solid separator(s) solids line 154, solids extracted from dryer cyclone 145A and from equipment dust cyclone 145B, via solids outlet lines 153A and 153B respectively, and/or solids extracted from baghouse 199 via baghouse solids outlet line 153C into recycle elevator 152; and belt conveyor 157 configured to introduce on-size ammonium sulfate granules in non-recycle on-size product line 147B into product cooler 149. A system according to this disclosure may comprise all, none, or a combination of the aforementioned conveyors.

Method for Ammonium Sulfate Production.

Also disclosed herein is a method for producing ammonium sulfate. Description of the method will now be made with reference to FIGS. 1 and 2A-2C.

An aqueous solution of concentrated sulfuric acid and anhydrous ammonia is reacted within a pipe cross reactor, to produce ammonium sulfate via ammoniation of the sulfuric acid. For example, in the embodiment of FIG. 1, PCR feed comprising anhydrous ammonia, sulfuric acid, and scrubber liquor is introduced into PCR 10 via PCR feed inlet line 5. In the embodiment of FIGS. 2A-2C, anhydrous ammonia liquid is introduced via anhydrous ammonia line 117 and PCR ammonia feed inlet line 105A, concentrated sulfuric acid is introduced via PCR sulfuric acid feed inlet line 105B, and scrubber liquor (and also additive in the embodiments of FIGS. 2B and 2C) is introduced via PCR scrubber liquor feed inlet line 105C, into PCR 110. In embodiments, the scrubber liquor comprises water, sulfuric acid, and/or dissolved ammonium sulfate. As noted hereinabove, the concentration of sulfuric acid introduced into PCR 10/110 may be in the range of from about 60 to about 99 weight percent, from about 90 to about 99 weight percent, or from about 92 to about 98 weight percent. The neutralization reaction is exothermic, and although higher concentrations of sulfuric acid can be successfully converted to ammonium sulfate, it is desirable to balance the cooling effects, provided by evaporation of water that occurs within granulator 20/120 due to the high temperature of the PCR product introduced thereto, with the ability to introduce a high feed of sulfuric acid to the pipe cross reactor. In embodiments, PCR 10/110 is operated at a temperature in the range of from about 200° F. to about 260° F., from about 210° F. to about 250° F., or from about 220° F. to about 240° F. In embodiments, PCR 10/110 is operated at a maximum temperature of less than or equal to about 260° F. (126.7° C.), 255° F. (123.9° C.), 250° F. (121.1° C.), 245° F. (118.3° C.), 240° F. (115.6° C.), 235° F. (112.8° C.), 230° F. (110° C.), 225° F. (107.2° C.), 220° F. (104.4° C.), 210° F. (98.9° C.), or 200° F. (93.3° C.).

As noted hereinabove, from about 60 to about 90 weight percent, from about 70 to about 90 weight percent, or from about 75 to about 85 weight percent of the total anhydrous ammonia required for ammoniation of the sulfuric acid to be neutralized is introduced into PCR 10/110. The amount introduced to PCR 10/110 may be determined by ratio control in the sulfuric acid. In embodiments, greater than or equal to about 60, 70, 80, or 90 weight percent of the total anhydrous ammonia required for ammoniation of the sulfuric acid to be neutralized is introduced into PCR 10/110. In embodiments, less than or equal to about 5, 10, 15, 20, 30, or 40 weight percent of the total anhydrous ammonia required for ammoniation of the sulfuric acid to be neutralized is added directly to the granulator, as discussed further hereinbelow.

In embodiments, from about 70 to about 95, from about 75 to about 90, or from about 80 to about 90 percent of the sulfuric acid is added via the pipe reactor, with the balance being introduced via the scrubbers.

In embodiments, the ammonia fed to the PCR 110 via line 105A has a pressure in the range of from about 40 to about 150 psig. In embodiments, the ammonia fed to the PCR 110 via line 105A has a pressure in the range of from about 40 to about 100 psig. In embodiments, the ammonia fed to the PCR 110 via line 105A has a pressure of about 40, 50, 60, 70, 80, 90, or 100 psig. In embodiments, the sulfuric acid to PCR 110 via line 105B has a pressure in the range of from about 35 to about 150 psig. In embodiments, the sulfuric acid to PCR 110 via line 105B has a pressure of in the range of from about 35 to about 90 psig. In embodiments, the ammonia fed to the PCR 110 via line 105A has a pressure of about 30, 35, 40, 45, 50, 55, or 60 psig.

As noted hereinabove, in embodiments, the PCR is fed a feed comprising from about 40 to about 90, from about 50 to about 70, or from about 60 to about 65 weight percent anhydrous ammonia; from about 25 to about 75, from about 40 to about 65, or from about 45 to about 55 weight percent scrubber liquor/water; and, the balance, sulfuric acid.

In embodiments, the PCR is fed a feed comprises anhydrous ammonia and scrubber water in a ratio of from about from about 60 to about 90 weight percent anhydrous ammonia and from about 25 to about 75% weight percent scrubber water.

Pipe cross reactor 10/110 may be operated at a temperature of up to about 450° F. (232.2° C.), and/or a pressure of greater than or equal to about 150 psi. Accordingly, as noted above, due to the extreme operating conditions within PCR 10/110, PCR 10/110 (and/or piping thereto and/or to granulator 20/120 carrying concentrated sulfuric acid, for example, concentrated sulfuric acid transport lines 114, 114A, 114B, 114C, and/or 105B) may be made from resistant materials, such as TEFLON®-lined, or the like (e.g., polytetrafluoroethylene (PTFE), PFA, etc.), and/or stainless steel (e.g., 316 SS) piping, alloy 20, HASTELLOY C-276® (i.e., Alloy C-276), or a combination thereof.

PCR product comprising ammonium sulfate produced therein is introduced into granulator 20/120 via PCR product outlets 11A (in the embodiment of FIG. 1), or PCR product outlet line 111 and PCR product sparger 111A (in the embodiments of FIGS. 2A-2C). The remaining anhydrous ammonia required for ammoniation of the sulfuric acid to be neutralized is added directly to the granulator, as discussed hereinabove. In embodiments, less than or equal to about 5, 10, 15, 20, 30, or 40 weight percent of the total anhydrous ammonia required for ammoniation of the sulfuric acid to be neutralized is added directly to granulator 20/120, as a liquid, via anhydrous ammonia inlet line 6 and ammonia sparger 12 (in the embodiment of FIG. 1), or via anhydrous ammonia feed line 117 and granulator liquid ammonia inlet line 106 and ammonia sparger 112 (in the embodiment of FIGS. 2A-2C). As noted hereinabove, sparging this remaining anhydrous ammonia directly into/onto the circulating bed within granulator 20/120 completes the reaction and promotes rapid solidification of the ammonium sulfate granules, since the anhydrous ammonia temperature is approximately −28° F. (−33.3° C.) when it enters the granulator 20/120 (e.g., via spray nozzles of ammonia sparger 12/112). Quench cooling of the PCR product within granulator 20/120 via the introduction of liquid, anhydrous ammonia helps control the exothermic reaction.

Seed material comprising recycled ammonium sulfate granules is introduced into the top of granulator 20/120 via seed material recycle line 21/121. As discussed further hereinbelow, the seed material may be obtained from dryer and/or dust cyclones 45A/145A and/or 45B/145B, baghouse 199 (in the embodiment of FIG. 2C), from screening of the ammonium sulfate granules extracted from dryer discharge elevator 35/135/135A (as described further hereinbelow), or a combination thereof. Desirably, the seed material is selected to minimize the production of oversized and undersized (i.e., fines) ammonium sulfate granules, whereby the amount of recycle to granulator 20/120 can be reduced. Excessive recycle to the granulator is undesirable, as it limits production. In embodiments, the seed material introduced into granulator 20/120 via seed material recycle line 21/121 has a SGN in the range of from about 50 to about 500, from about 100 to about 400, or from about 250 to about 350.

As noted hereinabove, one or more additive may be introduced into granulator 20/120. Such additive(s) may serve to increase the SGN, increase the hardness, enhance the micronutrient properties, and/or enhance the pill characteristics of the product ammonium sulfate granules. In embodiments, the additive comprises alum. In embodiments, the additive comprises aluminum sulfate. In embodiments, the granulator feed comprises from about 0.1 to about 0.7 weight percent, from about 0.1 to about 0.5 weight percent, or from about 0.2 to about 0.4 weight percent additive or aluminum. As indicated in the embodiment of FIG. 2A, the additive may be introduced into granulator 20/120 via additive inlet line 115 and additive sparger 116. Alternatively, as indicated in the embodiments of FIGS. 2B and 2C, the additive may be introduced into granulator 20/120 via introduction into PCR feed tank 186 (in the embodiment of FIG. 2B), and/or via introduction into PCR scrubber liquor feed inlet line 105C (in the embodiment of FIG. 2C).

As noted hereinabove, air may also be introduced into granulator 20/120 (e.g., at or a near the feed end thereof) to promote removal of steam and ammonia. For example, as indicated in the embodiments of FIGS. 2A and 2B, a granulator air inlet line 107A may be utilized to introduce air into granulator 120.

Within granulator 20/120, the seed material grows larger from the input of the ammonium sulfate from PCR 10/110. As noted hereinabove, the neutralization reaction liberates significant quantities of heat, thus raising the mixture temperature so that as the PCR product mixture exits PCR 10/110 into granulator 20/120, excess water evaporates as the solution is sprayed onto bed of ammonium sulfate granules therein, said bed which may be rotating. Granulator 20/120 is operated at a pressure that is less than atmospheric pressure (e.g., less than about 1 psi), such that any unreacted ammonia is vented. Ammonia and other gas/vapor is extracted from granulator 20/120 via granulator vapor outlet line 26/126/126A/126'.

Vented ammonia may be scrubbed and the scrubber liquor recycled to granulator 20/120. Vented ammonia in granulator vapor/gas outlet line 26/126 may be introduced (via line 126 in FIG. 2A and line 126B in FIGS. 2B and 2C) into ammonia scrubber 164. Within ammonia scrubber 164, ammonia is scrubbed from the granulator vent gas, for example, via contact with water/scrubber liquor spray introduced via water spray inlet line 165/165A/165B, thus providing granulator scrubber scrubbed liquid, which is extracted from granulator scrubber 164 via granulator scrubber liquid outlet line 166. Scrubbed granulator offgas may be extracted from granulator scrubber 164 via granulator scrubber gas outlet line 167. As noted in the embodiment of FIG. 2B, a portion of the granulator offgas in line 126 may be combined via line 126C with scrubbed granulator offgas in line 167.

Product ammonium sulfate is extracted from granulator 20/120 via granulator product outlet line 25/125. Control of the exothermic reaction, and utilization of anhydrous ammonia aid in reducing the amount of moisture (e.g., water) in the granulator product. For example, the 'wet' ammonium sulfate product extracted from granulator 20/120 via granulator product outlet line 25/125 may comprise from about 2.0 to about 6.0, from about 2 to about 5, from about 2 to about 4, or less than or equal to about 6, 5, or 4 weight percent moisture. In embodiments, the granulator discharge in granulator product outlet line 25/125 has a pH in the range of from about 3.0 to about 5.0. In embodiments, the granulator discharge in granulator product outlet line 25/125 has a pH of about 3.7, 4.0, 4.2, 4.4, 4.6, 4.8, or 5.0.

The 'wet' ammonium sulfate granules exiting granulator 20/120 via granulator product outlet line 25/125 are introduced into dryer 30/130, wherein the remaining excess water content is removed/reduced. For example, as noted hereinabove, greater than or equal to about 5, 4, 3, 2, or 1 weight percent of moisture may be removed via passage through dryer 30/130, such that the 'dry' ammonium sulfate granules extracted from dryer 30/130 via dryer outlet line 32/132 may have a moisture content of less than or equal to about 4, 3, 2, or 1 weight percent.

Dryer 30/130 may operate via combustion of fuel gas. For example, in the embodiment of FIG. 1, combustion air (which may be ambient air) in combustion air inlet line 7, and fuel gas in fuel gas line 8, are burned in one or more burner 13, thus providing heat for the drying of the 'wet' ammonium sulfate granules introduced into dryer 30 via granulator product outlet line 25. In the embodiments of FIGS. 2A-2C, combustion air in combustion air line 107B, and fuel gas (e.g., natural gas and/or propane) in fuel gas line 108 may be introduced into dryer 130 via dryer inlet line 109. In embodiments, the flow of air within dryer 30/130 is co-current with the flow of ammonium sulfate granules. In embodiments, the flow of air within dryer 30/130 is counter-current with the flow of ammonium sulfate granules.

A gas stream comprising air and ammonium sulfate dust may be extracted from dryer 30/130 via dryer gas outlet line 31/131. As noted hereinabove, the utilization of anhydrous ammonia (and sparging of a portion (e.g., 10 to 40 weight percent) of the anhydrous ammonia as liquid directly into the granulator) and incorporation of the pipe cross reactor 10/110, which introduces hot ammonium sulfate granular PCR product into granulator 20/120 results in a granulator discharge product which comprises less moisture than conventional granulator product. Accordingly, in embodiments, less fuel gas (e.g., natural gas) is required in dryer 30/130 to effect sufficient drying of the 'wet' granulator discharge product introduced thereto. For example, in embodiments, less than or equal to about 0.08, 0.07, 0.06, 0.05, or 0.04 MMBTU of fuel gas is required per ton dried ammonium sulfate fed extracted from dryer 30/130. In embodiments, from about 0.04 to about 0.08, from about 0.05 to about 0.07, or from about 0.03 to about 0.10 MMBTU of fuel gas is required per ton of dried ammonium sulfate extracted from dryer 30/130. The dryer combustion chamber temperature may be less than about 570° F. (298.9° C.). The dryer air (e.g., hot gas) inlet temperature may be in the range of from about 400° F. (204.4° C.) to about 500° F. (260° C.). The dryer air outlet temperature may be in the range of from about 180° F. (82.2° C.) to about 230° F. (110° C.). The dryer ammonium sulfate product outlet temperature may be in the range of from about 180° F. (82.2° C.) to about 210° F. (98.9° C.).

The hot, dry ammonium sulfate granules are extracted from dryer 30/130 via dryer outlet line 32/132. As noted in FIG. 1, a magnet 33 may be positioned on dryer outlet line 32, and configured to remove magnetic materials (e.g., metals) from the dried granules. Dried ammonium sulfate may be introduced into dryer discharge elevator 35/135/135A, optionally via conveyor belt 134, as indicated in the embodiment of FIGS. 2A and 2B. Dryer discharge elevator 135 of FIGS. 2A and 2B conveys dried material to screen elevator 140, while modified dryer discharge elevator 135A of FIG. 2C conveys dried material to sizing screen(s) 144.

Ammonium sulfate granules exiting dryer discharge elevator 35/135 via dryer discharge elevator outlet line 36/136 may be introduced, optionally via conveyor belt 137, into screen elevator 140. Screen elevator 140, conveys the material therein to sizing screens 144.

In the embodiments of FIGS. 1 and 2A-2B, ammonium sulfate granules exiting screen elevator 140 via screen elevator outlet line 142 may be introduced, optionally via screw 143, into sizing screens 144. In the embodiment of FIG. 2C, ammonium sulfate granules exiting dryer discharge elevator 135A via dryer discharge elevator outlet line 136A are introduced, via screen feed conveyor 143A, 3-way splitter, and screen feed lines 195A-C, to sizing screen(s) 144. Sizing screens 144 provide an oversized ammonium sulfate product, which is extracted from sizing screens 144 via oversized screen product outlet line 146, an undersized (or 'fines') ammonium sulfate product, which is extracted from sizing screens 144 via undersized or 'fines' screen product outlet line 148, and an on-size ammonium sulfate product, which is extracted from sizing screens 144 via on-size product screen outlet line 147. As noted hereinabove, sizing screens 144 may comprise a first screen configured for passage therethrough of granules having a largest dimension of less than or equal to about 3.5 mm, 4 mm, or 5 mm; and a second screen configured for passage therethrough of granules having a largest dimension of less than or equal to about 1 mm, 1.5 mm, or 2 mm.

In embodiments, the oversized ammonium sulfate granules have a largest dimension (e.g., diameter) that is greater than about 3.5 mm, 4 mm, or 5 mm. In embodiments, the undersized fines granules have a largest dimension (e.g., diameter) that is less than about 1 mm, 1.5 mm, or 2 mm. In embodiments, the on-size ammonium sulfate granules have a size in the range of from about 2.0 mm to about 3.8 mm, from about 2.5 mm to about 3.5 mm, or from about 2.8 mm to about 3.2 mm. That is, in embodiments, the on-size ammonium sulfate granules have a SGN in the range of from about 200 to about 380, from about 250 to about 350, or from about 280 to about 320. In embodiments, greater than or equal to about 50, 60, 70, or 80 weight percent of the ammonium sulfate granules in the granulator product are on-size granules.

Oversized ammonium sulfate granules in the oversized ammonium sulfate product extracted from sizing screens 144 via oversized ammonium sulfate screen product line 146 may be milled in mill(s) 150, to reduce the size thereof. Mill(s) 150 may comprise one or more chain mill. Mill(s) 150 may serve to reduce the granule size of the oversized ammonium sulfate granules introduced thereto to provide milled oversized ammonium sulfate product, which is extracted from mill(s) 150 via milled oversized ammonium sulfate product line 146A. The milled product in milled product line 146A may have an average granule size of less than or equal to about 2 mm, 1.5 mm, or 1 mm. All or portions of the milled ammonium sulfate product in milled oversized ammonium sulfate product line 146A and the ammonium sulfate fines in undersized or 'fines' screen product outlet line 148 may be introduced into recycle elevator 152, via recycle elevator inlet line 151. A portion of the on-size ammonium sulfate granules extracted from sizing screens 144 via on-size product screen outlet line 147 may also be introduced, via recycle on-size product line 147A and recycle elevator inlet line 151, into recycle elevator 152. Solids extracted from dryer cyclone 45A/145A and/or from dust cyclone 45B/145B may also be recycled to granulator 20/120 via, for example, introduction via solids recycle line 154, a screw feeder (not shown in FIGS. 2A-2C), and recycle elevator 152. As noted hereinabove, desirably, the ammonium sulfate seed material introduced into granulator 20/120 via seed material inlet line 21/121 has a suitable size, such that the amount of fines and/or oversized ammonium sulfate granules produced therefrom within granulator 20/120 is minimized.

How much, if any, on-size ammonium sulfate product is recycled to granulator 20/120 via recycle elevator 152 may be controlled via valve V1. In embodiments, the amount of ammonium sulfate granule product recycled via milled product line 146A, undersized ammonium sulfate granule outlet line 148, and recycle on-size product line 147A is from about 3 to about 6, or from about 3 to about 5 times (by weight) of the amount of on-size ammonium sulfate product in non-recycle, on-size ammonium sulfate product line 147B. Gas comprising dust (e.g., ammonium sulfate dust) may be extracted from sizing screens 144 via sizing screen(s) dust outlet line(s) 156.

The on-size, ammonium sulfate product which is not recycled to granulator 120 is introduced via non-recycle, on-size ammonium sulfate product line 147B, and optionally belt conveyor 157, into product cooler, 149. Within product cooler 149, the temperature of the ammonium sulfate granular product is reduced from a temperature of greater than about 225° F. (107.2° C.), 200° F. (93.3° C.), or 190° F. (87.8° C.), to a temperature of less than or equal to about 150° F. (65.6° C.), 140° F. (60° C.), or 120° F. (48.9° C.). Product cooler 149 may also serve to dedust the ammonium sulfate product granules. In embodiments, the deduster is aqueous. In embodiments, the deduster is non-aqueous. In embodiments, dedusting is performed by introducing a non-aqueous deduster, such as a glycerin-based deduster, into product cooler 149 via deduster inlet line 102, and introducing air into product cooler 149 via product cooler air inlet line 107C. Use of a non-aqueous deduster may serve to increase the shelf life of the ammonium sulfate product, minimize product setup, and/or minimize water addition to the ammonium sulfate product granules. In embodiments, utilization of a non-aqueous deduster provides a final granular ammonium sulfate product having a moisture content of less than or equal to about 0.5, 0.45, 0.4, 0.35, 0.3, 0.25, 0.2, 0.15, or 0.1 weight percent. In embodiments, the dedusted ammonium sulfate product granules have a shelf life of greater than or equal to about 6 months. In embodiments, from about 5 to about 12 pounds, from about 6 to about 11 pounds, or from about 7 to about 10 pounds of a glycerin-based deduster comprising glycerin is introduced per pound of ammonium sulfate into product cooler 149 for dedusting the ammonium sulfate product granules. In embodiments, about 5, 5.5, 6, 6.5, 7, 7.5, 8, 8.5, 9, 9.5, or 10 pounds of a glycerin-based deduster comprising glycerin is introduced per pound of ammonium sulfate into product cooler 149 for dedusting the ammonium sulfate product granules.

Gas (e.g., comprising air and perhaps entrained dust) is extracted from product cooler 149 via product cooler gas outlet line 161. Dedusted and/or cooled ammonium sulfate product is extracted from product cooler 149 via product cooler product outlet line 187. Ammonium sulfate product extracted from product cooler 149 via product cooler product outlet line 187 is introduced, optionally via belt scale 188 and product elevator inlet line 189, into product elevator 190. Product elevator 190 serves to convey the ammonium sulfate product. Ammonium sulfate product granules are extracted from product elevator 190 via ammonium sulfate product outlet line 191. A product conveyor 192 may serve to transport product ammonium sulfate granules to, for example, a warehouse 193 for storage.

As noted in the embodiment of FIG. 2C, ammonium sulfate product extracted from product elevator 190 via product elevator outlet line 191 may be introduced into polishing screen 196. Fines separated via polishing screen 196 may be introduced via fines outlet line 196A and product recycle line 198 to modified dryer discharge elevator 135A (or to screen elevator 140 in the embodiments of FIGS. 2A and 2B). The remainder of the polished material may be introduced via line 196B into polishing screen diverter 197. Polishing screen diverter 197 diverts a first portion of the polished product into line 197A, and a second portion of the polished product into polished product line 197B. The first diverted portion in line 197A may be combined with the polished fines in fines outlet line 196A and recycled via product recycle line 198, as noted hereinabove. The second diverted portion in line 197B may be conveyed via product conveyor 192.

Recycle elevator 152 serves to introduce ammonium sulfate recycle granules (from milled product line 146A, recycle on-size product line 147A, and/or undersized ammonium sulfate granule outlet line 148) to granulator 20/120. Recycle elevator 152 serves to recycle seed material to granulator 120 via seed material recycle line 121. Gas comprising dust (e.g., ammonium sulfate dust) may be extracted from recycle elevator 152 via recycle elevator gas outlet line 155.

Air and dust extracted from dryer 30/130 may be introduced via dryer gas outlet line 31/131 into dryer cyclone 45A/145A. Dryer cyclone 45A/145A is operated to separate dust from the gas/vapor introduced thereto via dryer gas outlet line 31/131. Separated solids are extracted from dryer cyclone 45A/145A via dryer cyclone solids outlet line 153A. Gas and dust extracted from screen elevator 140 via screen elevator gas outlet line 141, from sizing screens 144 via sizing screens gas outlet line(s) 156, from recycle elevator 152 via recycle elevator gas outlet line 155, and/or from product cooler 149 via product cooler gas outlet line 161 (in the embodiments of FIGS. 2B and 2C), may be introduced into equipment dust cyclone 45B/145B via equipment dust cyclone inlet line 158. Equipment dust cyclone 45B/145B is operated to separate dust from the gas/vapor introduced thereto via equipment dust gas cyclone inlet line 158. Separated solids are extracted from equipment dust cyclone 45B/145B via dust cyclone solids outlet line 153B. As noted hereinabove, solids in dryer cyclone solids outlet line 153A, dust cyclone solids outlet line 153B, and/or baghouse solids outlet line 153C (in the embodiment of FIG. 2C) may be recycled to granulator 20/120, for example, via solids line 154, a dust screw, and recycle elevator 152.

Solids-reduced gas extracted from dryer cyclone 45A/145A via dryer cyclone gas outlet line 159A may be introduced into dryer primary scrubber 169A. Dryer primary scrubber 169A may be operated to scrub dust and ammonia from the gas introduced thereto. Scrubber liquid may be extracted from dryer primary scrubber 169A via dryer primary scrubber liquid outlet line 172A. Scrubbed tailgas may be extracted from dryer primary scrubber 169A via dryer primary scrubber gas outlet line 170A, optionally with the use of dryer primary scrubber gas outlet fan 171A.

Solids-reduced gas extracted from equipment dust cyclone 45B/145B via dust cyclone gas outlet line 159B (159B' in FIG. 2C), gas extracted from product cooler 149 via product cooler gas outlet line 161 (in the embodiment of FIG. 2A), scrubbed granulator offgas extracted from granulator scrubber 164 via granulator scrubber gas outlet line 167, and/or air in air inlet line 107D may be introduced into recycle cooler and granulator primary scrubber 169B. Air may be introduced via line 107D to remove steam and/or cool the contents of recycle cooler and granulator primary scrubber 169B. Recycle cooler and granulator scrubber 169B may be operated to remove dust and ammonia via scrubbing with sulfuric acid. Scrubber liquid may be extracted from recycle cooler and granulator primary scrubber 169B via recycle cooler and granulator primary scrubber liquid outlet line 172B. Scrubbed tailgas may be extracted from recycle cooler and granulator primary scrubber 169B via recycle cooler and granulator primary scrubber gas outlet line 170B, optionally with the use of recycle cooler and granulator primary scrubber gas outlet fan 171B.

Scrubbed tailgas extracted from dryer primary scrubber 169A via dryer primary scrubber gas outlet line 170A may be introduced into dryer tailgas scrubber 176A. Dryer tailgas scrubber 176A may be operated to scrub ammonia and dust via scrubbing liquid comprising sulfuric acid. Scrubbed dryer tailgas may be extracted from dryer tailgas scrubber 176A via dryer tailgas scrubber gas outlet line 180A, optionally with the use of dryer tailgas scrubber gas outlet fan 181A. Scrubber liquid may be extracted from dryer tailgas scrubber 176A via dryer tailgas scrubber liquid outlet line 182A.

Scrubbed tailgas extracted from recycle cooler and granulator primary scrubber 169B via recycle cooler and granulator primary scrubber gas outlet line 170B may be introduced into recycle cooler and granulator tailgas scrubber 176B. Recycle cooler and granulator tailgas scrubber 176B may be operated to scrub dust and ammonia via contact with scrubbing liquid comprising sulfuric acid. Scrubbed recycle cooler and granulator tailgas may be extracted from recycle cooler and granulator tailgas scrubber 176B via recycle cooler and granulator tailgas scrubber gas outlet line 180B, optionally with the use of recycle cooler and granulator tailgas scrubber gas outlet fan 181B. Scrubber liquid may be extracted from recycle cooler and granulator tailgas scrubber 176B via recycle cooler and granulator tailgas scrubber liquid outlet line 182B.

Scrubber liquid extracted from dryer tailgas scrubber 176A via dryer tailgas scrubber liquid outlet line 182A, scrubber liquid extracted from recycle cooler and granulator tailgas scrubber 176B via recycle cooler and granulator tailgas scrubber liquid outlet line 182B, concentrated sulfuric acid in line 114B, and/or plant water in plant water inlet line 101 may be introduced into dryer/recycle tailgas scrubber sump tank 175B. A portion of the contents of dryer/recycle tailgas scrubber sump tank 175B may be introduced via recycle-preneutralizer-tailgas recirculation flow line 183A to enhance removal of dust and ammonia. A portion of the contents of dryer/recycle tailgas scrubber sump tank 175B may be introduced via dryer-tailgas recirculation flow line 183B to enhance removal of dust and ammonia. A portion of the contents of dryer/recycle tailgas scrubber sump tank 175B may be introduced via dryer/recycle tailgas scrubber sump tank outlet flow line 183C to dust or 'primary scrubbers' sump tank 175A.

Scrubber liquid extracted from dryer primary scrubber 169A via dryer primary scrubber liquid outlet line 172A, scrubber liquid extracted from recycle cooler and granulator primary scrubber 169B via recycle cooler and granulator primary scrubber liquid outlet line 172B, and/or concentrated sulfuric acid in concentrated sulfuric acid line 114B may be introduced into primary scrubbers sump tank 175A. A portion of the contents of primary scrubbers sump tank 175A may be introduced via dryer granulator-primary scrubber recirculation flow line 184A to enhance removal of dust and ammonia. A portion of the contents of primary scrubbers sump tank 175A may be introduced via recycle cooler-preneutralizer-primary scrubber recirculation flow line 184B to enhance removal of dust and ammonia. A portion of the contents of primary scrubbers sump tank 175A may be introduced via primary scrubbers sump tank outlet flow line 184C to granulator scrubber (also referred to herein as 'ammonia' scrubber 175C) sump tank 175C.

Scrubber liquid comprising scrubbed ammonia extracted from granulator scrubber 164 via ammonia scrubber liquid outlet line 166, a portion of the contents of primary scrubbers sump tank 175A extracted from primary scrubbers sump tank 175A via primary scrubbers outlet flow line 184C, and/or concentrated sulfuric acid in concentrated sulfuric acid line 114A may be introduced into ammonia scrubber sump tank 175C. A portion of the contents of ammonia scrubber sump tank 175C may be introduced via granulator scrubber recirculation flow line 185A to enhance removal of dust and ammonia. A portion of the contents of ammonia scrubber sump tank 175C may be introduced via ammonia sump tank liquid outlet line 185B to PCR feed tank 186, which may serve to provide scrubber liquor to PCR 110 via PCR scrubber liquor feed inlet line 105C. In embodiments, the scrubber liquor in PCR feed tank 186 comprises water, sulfuric acid, and/or dissolved ammonium sulfate.

Ammonium Sulfate Product.

The herein disclosed system and method may be operable to produce ammonium sulfate granules having a desired SGN (e.g., in the range of from about 250 to about 330, from about 280 to about 350, or from about 280 to about 320), enhanced pill characteristics, enhanced micronutrient composition, and/or a hardness of at least 8 to 14 pounds. In embodiments, the product ammonium sulfate granules have a SGN of at least 250. In embodiments, the product ammonium sulfate granules have a SGN of about 250, 260, 270, 280, 290, 300, 310, 320, or 330. In embodiments, the herein-disclosed system and method can be utilized to produce more than 400, 500, 600, 700, 1000, 1500, 1700, 1750, 1800, 1850, 2000, or 2200 short tons per day (STPD) of granular ammonium sulfate product. In embodiments, the herein-disclosed system and method are utilized to produce from about 1300-1850 STPD of granular ammonium sulfate.

In embodiments, the ammonium sulfate granules have a crush strength of 8, 9, 10, 11, 12, or 13 pounds per granule. In embodiments, the product ammonium sulfate granules have a moisture content in the range of from about 0.10 to about 0.50 percent. In embodiments, the product ammonium sulfate granules have a moisture content of less than or equal to about 0.5, 0.45, 0.4, 0.35, 0.3, 0.25, 0.2, 0.15, or 0.1 percent. In embodiments, the product ammonium sulfate granules comprise less than about 5, 4, 3, 2, or 1 percent fines. In embodiments, the product ammonium sulfate granules comprise at least or equal to about 20.2 percent nitrogen. In embodiments, the product ammonium sulfate granules comprise at least or equal to about 23.8 percent sulfur.

In embodiments, utilization of an additive comprising aluminum (e.g., aluminum sulfate and/or aluminum alum) provides ammonium sulfate product comprising from about 0.2 to about 0.4 weight percent aluminum, thus enhancing the hardness, pill characteristics, and/or micronutrient value of the product.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, and so forth). Use of the term 'optionally' with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

Accordingly, the scope protection is not limited by the description set out above but is only limited by the claims which follow, that scope including all equivalents of the subject matter of the claims. Each and every original claim is incorporated into the specification as an embodiment of the present invention. Thus, the claims are a further description and are an addition to the preferred embodiments of the present invention. The disclosures of all patents, patent applications and publications cited herein are hereby incorporated herein by reference, to the extent that they provide procedural or other details consistent with and supplementary to those set forth herein.

What is claimed is:

1. A system for the production of ammonium sulfate granules, the system comprising:
    a pipe cross reactor (PCR) configured to contact concentrated sulfuric acid with anhydrous ammonia to produce a PCR product comprising ammonium sulfate; and
    a granulator fluidly connected to the PCR, whereby PCR product extracted from the PCR can be introduced into the granulator, and comprising an inlet for ammonium sulfate seed material, an ammonia sparger configured to spray liquid anhydrous ammonia directly onto a bed of ammonium sulfate granules within the granulator, a granulator vent configured for extraction of a vapor comprising unreacted ammonia from the granulator, and a granulator product outlet configured for extraction of granulator product comprising ammonium sulfate granules from the granulator,
    wherein the pipe cross reactor comprises a discharge section located internal to the granulator, and configured to introduce the PCR product ammonium sulfate thereto.

2. The system of claim 1 wherein the PCR is constructed to be resistant to the concentrated sulfuric acid introduced thereto.

3. The system of claim 1 wherein the PCR is constructed of acid resistant material.

4. The system of claim 1 wherein the PCR is fluidly connected to the granulator via a PCR product sparger configured to spray the PCR product into the granulator via a plurality of PCR product sparger nozzles.

5. The system of claim 4 wherein the ammonia sparger is located below the PCR product sparger.

6. The system of claim 1 wherein the granulator is a rotary granulator.

7. A system for the production of ammonium sulfate granules, the system comprising:
    a pipe cross reactor (PCR) configured to contact concentrated sulfuric acid with anhydrous ammonia to produce a PCR product comprising ammonium sulfate; and
    a granulator fluidly connected to the PCR, whereby PCR product extracted from the PCR can be introduced into the granulator, and comprising an inlet for ammonium sulfate seed material, an ammonia sparger configured to spray liquid anhydrous ammonia directly onto a bed of ammonium sulfate granules within the granulator, and a granulator vent configured for extraction of a vapor comprising unreacted ammonia from the granulator, and a granulator product outlet configured for extraction of granulator product comprising ammonium sulfate granules from the granulator; and a dryer fluidly connected to the granulator via the granulator product outlet, whereby granulator product can be introduced into the dryer, and configured to reduce the moisture content thereof.

8. The system of claim 7 wherein the dryer is a rotary dryer.

9. The system of claim 7 wherein the dryer is configured to provide a dried ammonium sulfate product comprising less than about 4 weight percent moisture.

10. The system of claim 9 wherein the dryer operates with less than about 0.08 MMBTU of fuel gas per ton of granulator product introduced thereto.

11. The system of claim 7 wherein the dryer is a co-current flow dryer, wherein combustion air and fuel gas introduced thereto flow co-currently with the flow of granulator product therethrough.

12. The system of claim 7 further comprising one or more sizing screens configured to separate on-size ammonium sulfate granules having a largest dimension within a desired range from undersized ammonium sulfate granules having a largest dimension below the desired range and oversized ammonium sulfate granules having a largest dimension above the desired range.

13. The system of claim 12 further comprising one or more recycle lines configured to recycle at least a portion of the undersized ammonium sulfate granules, at least a portion of the oversized ammonium sulfate granules, a portion of the on-size ammonium sulfate granules, or a combination thereof, to the granulator as seed material.

14. The system of claim 12 wherein the on-size ammonium sulfate granules have a size guide number (SGN) in the range of from about 280 to about 350.

15. The system of claim 12 further comprising a product cooler/deduster fluidly connected to the one or more sizing screens, whereby at least a portion of the on-size ammonium sulfate granules can be introduced thereto, thus producing a dedusted ammonium sulfate product, and a product cooler offgas.

16. The system of claim 15 wherein the product cooler/deduster is configured to contact the on-size ammonium sulfate granules introduced thereto with a deduster.

17. The system of claim 16 wherein the deduster is non-aqueous.

18. The system of claim 15 further comprising a dryer cyclone fluidly connected to the dryer whereby at least a portion of a dryer vent gas can be introduced thereto, and configured to separate solids therefrom, thus producing a dryer cyclone offgas and a dryer cyclone separated solids stream.

19. The system of claim 18 further comprising a recycle line configured to introduce solids separated via the dryer cyclone into the granulator as at least a portion of the seed material.

20. The system of claim 18 further comprising one or more elevators configured to transport ammonium sulfate granules throughout the system, and further comprising a dust cyclone configured to separate dust comprising ammonium sulfate from gas introduced thereto from the one or more elevators, from the one or more sizing screens, or from a combination thereof, thus producing a dust cyclone offgas, and a dust cyclone separated solids stream.

21. The system of claim 20 further comprising a recycle line configured to introduce solids separated via the dust cyclone into the granulator as at least a portion of the seed material.

22. The system of claim 20 further comprising at least one scrubber selected from the group consisting of:

granulator scrubbers fluidly connected with the granulator, and configured to scrub unreacted ammonia from the vapor comprising unreacted ammonia extracted from the granulator, thus producing a granulator scrubber spent scrubber liquor comprising ammonia, and a granulator scrubber vent gas;

dryer primary scrubbers configured to scrub one or more components from at least a portion of the dryer cyclone offgas, thus providing a dryer primary scrubber spent scrubber liquor, and a dryer primary scrubber tailgas;

recycle cooler-granulator primary scrubbers configured to scrub one or more components from a gas comprising at least a portion of the granulator scrubber vent gas, at least a portion of the dust cyclone offgas, at least a portion of the product cooler offgas, or a combination thereof, thus providing a recycle cooler-granulator primary scrubber spent scrubber liquor, and a recycle cooler-granulator primary scrubber tailgas;

dryer tailgas scrubbers configured to scrub one or more components from the dryer primary scrubber tailgas, thus providing a dryer tailgas scrubber spent scrubber liquor, and a dryer tailgas scrubber tailgas; and recycle cooler-granulator tailgas scrubbers configured to scrub one or more components from the recycle cooler-granulator primary scrubber tailgas, thus providing a recycle cooler-granulator tailgas scrubber spent scrubber liquor, and a recycle cooler-granulator tailgas scrubber tailgas.

23. The system of claim 22 further comprising one or more recycle paths whereby all or portions of one or more spent scrubber liquor selected from the group consisting of granulator scrubber spent scrubber liquors, dryer primary scrubber spent scrubber liquors, recycle cooler-granulator primary scrubber spent scrubber liquors, dryer tailgas scrubber spent scrubber liquors, and recycle cooler-granulator tailgas scrubber spent scrubber liquors, may be introduced into the PCR.

24. The system of claim 1 further comprising an additive sparger configured to spray an additive into the granulator.

25. The system of claim 24 wherein the additive sparger is positioned above the ammonia sparger, above the elevation of introduction of the PCR product into the granulator, or both.

26. The system of claim 24 wherein the additive comprises aluminum sulfate.

27. A method of producing ammonium sulfate granules, the method comprising:

introducing a pipe cross reactor (PCR) feed comprising concentrated sulfuric acid and anhydrous ammonia into a PCR configured to produce ammonium sulfate via ammoniation of the sulfuric acid, thus producing a PCR product comprising ammonium sulfate; and separately introducing at least a portion of the PCR product, ammonium sulfate seed material, and liquid, anhydrous ammonia into a granulator configured to produce a granulator product comprising ammonium sulfate granules having size within a desired size range, wherein not less than about 10 weight percent and not more than about 40 weight percent of the stoichiometrically required amount of anhydrous ammonia is introduced directly into the granulator, and wherein the at least a portion of the PCR product is introduced into the pipe cross reactor via a discharge section thereof located internal to the granulator.

28. The method of claim 27 wherein the desired size range comprises size guide numbers (SGNs) from about 280 to about 350.

29. The method of claim 27 wherein the concentrated sulfuric acid has a concentration in the range of from about 90 weight percent to about 99 weight percent.

30. The method of claim 27 wherein the liquid anhydrous ammonia is introduced into the granulator via an ammonia sparger configured to distribute liquid anhydrous ammonia substantially uniformly across the granulator.

31. The method of claim 27 wherein the at least a portion of the PCR product is introduced into the granulator at a level above the level at which the liquid anhydrous ammonia is introduced.

32. The method of claim 27 further comprising introducing an additive into the granulator.

33. The method of claim 32 wherein the additive is added via an additive sparger.

34. The method of claim 33 wherein the additive sparger distributes the additive substantially uniformly across the granulator, at a level above the level of introduction of the at least a portion of the PCR product, at a level above the level of introduction of the liquid, anhydrous ammonia, or both.

35. The method of claim 34 wherein the additive is selected from the group consisting of alums.

36. The method of claim 35 wherein the additive comprises aluminum sulfate.

37. The method of claim 27 wherein the ammonium sulfate seed material is introduced into the granulator at or near a top thereof.

38. A method of producing ammonium sulfate granules, the method comprising:
    introducing a pipe cross reactor (PCR) feed comprising concentrated sulfuric acid and anhydrous ammonia into a PCR configured to produce ammonium sulfate via ammoniation of the sulfuric acid, thus producing a PCR product comprising ammonium sulfate,
    separately introducing at least a portion of the PCR product, ammonium sulfate seed material, and liquid, anhydrous ammonia into a granulator configured to produce a granulator product comprising ammonium sulfate granules having size within a desired size range; and
    drying the granulator product to produce a dried ammonium sulfate product having a moisture content of less than the moisture content of the granulator product.

39. The method of claim 38 further comprising separating the dried ammonium sulfate product into an undersized ammonium sulfate product comprising ammonium sulfate granules having a largest dimension below the desired size range, an oversized ammonium sulfate product comprising ammonium sulfate granules having a largest dimension above the desired size range, and an on-size ammonium sulfate product comprising ammonium sulfate granules having a largest dimension within the desired size range.

40. The method of claim 39 further comprising recycling at least a portion of the undersized ammonium sulfate product, at least a portion of the oversized ammonium sulfate product, a portion of the on-size ammonium sulfate product, or a combination thereof to the granulator as at least a portion of the seed material.

41. The method of claim 39 further comprising dedusting at least a portion of the on-size ammonium sulfate product, thus producing a dedusted ammonium sulfate product, and a deduster offgas.

42. The method of claim 41 wherein dedusting comprises contacting the at least a portion of the on-size ammonium sulfate product with a non-aqueous deduster.

43. The method of claim 41 further comprising separating ammonium sulfate-containing dust from a dryer offgas comprising same, thus producing a reduced-solids dryer offgas, and a separated ammonium sulfate-containing dust.

44. The method of claim 43 further comprising recycling at least a portion of the separated ammonium sulfate-containing dust to the granulator as seed material.

45. The method of claim 43 further comprising separating ammonium sulfate-containing dust from: a gas comprising same extracted from one or more elevators configured to transport ammonium sulfate granules; from one or more sizing screens utilized to separate the dried ammonium sulfate product into oversized, undersized, and on-size ammonium sulfate granules; or from a combination thereof, thus producing a reduced-solids offgas, and a second separated ammonium sulfate-containing dust.

46. The method of claim 45 further comprising:
    scrubbing unreacted ammonia from a granulator vent gas, thus producing a granulator scrubbing spent scrubber liquor comprising ammonia, and a granulator scrubbing vent gas;
    scrubbing one or more components from a gas comprising at least a portion of the reduced-solids dryer offgas, thus providing a dryer primary scrubbing spent scrubber liquor, and a dryer primary scrubbing tailgas;
    scrubbing one or more components from a gas comprising at least a portion of the granulator scrubbing vent gas, at least a portion of the reduced-solids offgas, at least a portion of the deduster offgas, or a combination thereof, thus providing a recycle cooler-granulator primary scrubbing spent scrubber liquor, and a recycle cooler-granulator primary scrubbing tailgas;
    scrubbing one or more components from the dryer primary scrubbing tailgas, thus providing a dryer tailgas scrubbing spent scrubber liquor, and a dryer tailgas scrubbing tailgas;
    scrubbing one or more components from the recycle cooler-granulator primary scrubbing tailgas, thus providing a recycle cooler-granulator tailgas scrubbing spent scrubber liquor, and a recycle cooler-granulator tailgas scrubbing tailgas;
    or a combination thereof.

47. The method of claim 46 further comprising recycling all or portions of one or more spent scrubber liquor selected from the group consisting of granulator scrubbing spent scrubber liquors, dryer primary scrubbing spent scrubber liquors, recycle cooler-granulator primary scrubbing spent scrubber liquors, dryer tailgas scrubbing spent scrubber liquors, and recycle cooler-granulator tailgas scrubbing spent scrubber liquors to the PCR.

* * * * *